United States Patent [19]
Katayama et al.

[11] Patent Number: 5,678,137
[45] Date of Patent: Oct. 14, 1997

[54] CAMERA WITH ANNULAR LIGHT SHIELDING MEMBER AROUND AXIALLY MOVING LENS HOUSING

[75] Inventors: Akira Katayama, Tokyo; Hiroshi Terunuma, Ichikawa; Minoru Kato, Kawasaki; Yoshio Imura, Yokohama; Noriyasu Kotani, Okegawa, all of Japan

[73] Assignee: Nikon Corporation, Tokyo, Japan

[21] Appl. No.: 482,503

[22] Filed: Jun. 7, 1995

Related U.S. Application Data

[62] Division of Ser. No. 418,899, Apr. 7, 1995, abandoned, which is a continuation of Ser. No. 270,319, Jul. 5, 1994, abandoned, which is a continuation of Ser. No. 138,385, Oct. 20, 1993, abandoned, which is a continuation of Ser. No. 717,346, Jun. 18, 1991, abandoned, which is a continuation-in-part of Ser. No. 607,710, Nov. 1, 1990, abandoned.

[30] Foreign Application Priority Data

| Nov. 29, 1978 | [JP] | Japan | 1-133980 U |
| Nov. 6, 1989 | [JP] | Japan | 1-287603 |
| Nov. 14, 1989 | [JP] | Japan | 1-131661 U |
| Nov. 20, 1989 | [JP] | Japan | 1-299568 |
| Jun. 22, 1990 | [JP] | Japan | 2-065494 U |

[51] Int. Cl.⁶ .......................... G02B 27/00; G03B 1/18
[52] U.S. Cl. .......................... 396/73; 359/611
[58] Field of Search ............... 354/288, 202, 354/195.1, 195.12; 396/72, 73, 439, 448, 535; 359/513, 600, 601, 611, 612

[56] References Cited

U.S. PATENT DOCUMENTS

5,034,762  7/1991  Kohmoto .................. 354/195.12

*Primary Examiner*—Safet Metjahic
*Assistant Examiner*—J. K. Han
*Attorney, Agent, or Firm*—Shapiro and Shapiro

[57] ABSTRACT

A camera has a light shielding member surrounding an axially movable lens housing arranged to project through a circular opening in a camera housing. The light shielding member has an annular disc portion with an inner peripheral grooved surface frictionally engaging an outer cylindrical surface of the lens housing. The disc portion is positioned between a transverse inner surface of the camera housing cover and a surface of a helicoid member. At its outer periphery, the light shielding member has a generally cylindrical flange that projects axially between a longitudinal inner surface of the camera housing and the helicoid.

4 Claims, 14 Drawing Sheets

CAMERA WITH ANNULAR LIGHT SHIELDING MEMBER AROUND AXIALLY MOVING LENS HOUSING

This is a division of application Ser. No. 08/418,899 filed Apr. 7, 1995, (abandoned), which is a continuation of application Ser. No. 08/270,319 filed Jul. 5, 1994 (abandoned), which is a continuation of application Ser. No. 08/138,385 filed Oct. 20, 1993 (abandoned), which is a continuation of application Ser. No. 07/717,346 filed Jun. 18, 1991 (abandoned), which is a continuation-in-part of application Ser. No. 07/607,710 filed Nov. 1, 1990 (abandoned).

BACKGROUND OF THE INVENTION

1. Field of the Invention

The present invention relates to a lens driving device for a zoom or a multifocus lens housing of a camera.

2. Related Background Art

Hitherto, in order to smoothly rectilinearly move a zoom or a multifocus lens, a lens driving device has been arranged in such a manner that there are provided a guide member for rectilinearly guiding the lens and a supporting member for supporting the guide member, and the guide member and the supporting member are arranged to be movable.

FIGS. 1, 2A and 2B are schematic views which respectively illustrate an example of the above-described structure.

A roller 1 serving as the support member is placed within a groove hole 2 formed in a guide member 3. Since the roller 1 is arranged to be capable of freely rotating, an excellent driving efficiency can be realized in comparison to a structure in which a pin is employed. Furthermore, the lens can be rectilinearly moved without a play or a catch even if excellent parallelism between the guiding direction and the optical axis and the accuracy are not realized.

However, the above-described conventional structure has a problem in that, in a case as shown in FIG. 2A in which the guide member is arranged to be a fork-like shape, the parallelism of the two side surfaces of the groove hole 2 in the guide member 3 which is positioned in contact with the roller 1 cannot be maintained by the side pressure given from the roller 1 when the lens is rectilinearly moved. As a result, the two end portions of the fork-like guide member 3 are undesirably opened, causing the accuracy in the guiding action to be deteriorated and a play to be generated. In order to overcome this problem, a structure has been employed in which the groove hole 4 is, as shown in FIG. 2B, closed. However, it leads to a fact that the length and the size of the guide member cannot be reduced. Therefore, the conventional technology encounters a problem in that a desire to reduce the size and the thickness of the camera for the purpose of realizing a collapsible lens housing cannot be met.

Hitherto, as light shielding means, a structure has been employed in which a light shielding member made of rubber, paper, or woven fabric is secured to a camera body or a lens housing at, for example, the inner helicoid by an adhesive or the like so as to cover the gap.

As an alternative to this, a rubber washer is inserted between the camera body and the lens housing for the purpose of covering the gap in such a manner that it is not fixed.

The above-described light shielding structure of a type in which the light shielding member is secured to the inner helicoid encounters a problem in that, if there is an eccentricity generated between the inner helicoid and the lens housing due to manufacturing or an eccentricity generated due to the assembling work or the adjustment work, a gap is formed due to the thus generated eccentricity, causing light to be leaked. If the light shielding member is strongly abutted against the inner helicoid for the purpose of preventing the light leakage, an excessively large resistance arises at the time of the rectilinear movement of the lens housing, causing a load necessary to drive the lens housing to be excessively enlarged.

In the case where the rubber washer is inserted between the camera body and the lens housing in such a manner that the washer is not fixed, the light leakage due to the above-described eccentricity can be prevented. However, a gap is formed with the inner helicoid when the lens housing is moved, in particular, when the same is forwards moved. In particular, light travelling in the direction except for the direction of the optical axis leaks.

Furthermore, in a camera of a type arranged in such a manner that an electric device including a CPU, a collimator and a photometer and the like is provided in the camera housing and an electric device including a shutter operating portion and a focusing device and the like is provided in the lens portion, a flexible print substrate (to be called an "FPC" hereinafter) for establishing the connection between the above-described two electric devices is accommodated in the lens housing in a spiral or folded manner.

In the above-described conventional structure, the FPC is not insulated from the inside portion of the lens housing. Therefore, the FPC has an exposure portion confronting the optical axis, causing the surface of the FPC to reflect the diffused light. As a result, a problem in terms of a ghost image takes place. Accordingly, coating or tape application becomes necessary in order to prevent the light reflection, causing the manufacturing cost to be raised.

Furthermore, there has been a fear of introduction of the FPC deflected into the optical path, causing the travel of the light beam to be obstructed. If the above-described problem is prevented by a design arrangement, the FPC must forcibly be bent or deflected so as to realize the above-described arrangement. As a result, the FPC is applied with excessively large force, causing the durability to be deteriorated.

Hitherto, a variety of cameras each of which has a barrier have been known which is arranged in such a manner that the forward end of the imaging lens is selectively capped by a barrier which is arranged to be optionally opened/closed. A barrier of the type described above is effective to protect the imaging lens from a damage due to an undesirable contact with an external substance or an adhesion of dust or the like. Furthermore, the above-described structure reveals an advantage in comparison to a lens cap employed in ordinary cameras since the fear of missing can be prevented. Therefore, it is preferable that a barrier of the type described above be employed in compact cameras.

As a camera with a barrier of the type described above, a collapsible type camera has been known. A collapsible type camera of the type described above usually employs a barrier opening/closing mechanism capable of automatically opening/closing the lens protection barrier in synchronization with the retraction/protraction action of the lens housing which holds the imaging lens. The reason for this lies in that it is advantageous in terms of operation and handling that the barrier is automatically opened/closed in synchronization with the movement of the lens housing since the lens housing is retracted in the camera housing when a picture is not taken and the lens housing is protracted from the camera housing when the picture is taken.

Although a variety of disclosures have been made relating to the barrier opening/closing mechanism for use in a collapsible type camera with the barrier of the type described above, a structure revealing both an extremely simple structure and easy handling has not as yet been disclosed.

For example, a barrier opening/closing mechanism has been disclosed in U.S. Pat. No. 4,864,338 which is arranged in such a manner that, when the lens housing is retracted, a portion of a barrier opening/closing member, which is arranged to be moved in synchronization with the movement of the lens housing, is engaged with a cam surface of an engagement member provided in the camera housing so that the barrier is closed. That is, the above-described barrier opening/closing mechanism is arranged in such a manner that a slide lever is provided for a transmission shaft which projects from the barrier opening/closing member disposed adjacent to the lens housing toward the camera housing. The slide lever is arranged to be selectively engaged with the cam surface of the engagement member disposed in the camera housing. The portion including the slide lever is forcibly rotated by the cam surface against the urging force of a spring which always urges the barrier in the opening direction. As a result, the barrier is opened/closed via the barrier opening/closing member including the transmission shaft.

The above-described conventional barrier opening/closing mechanism is arranged in such a manner that the slide lever which is urged by the simple tension spring in a direction in which the barrier is opened and the cam surface having a simple slope are engaged to each other so that the movement in the direction of the optical axis of the lens is converted into a rotary motion. Therefore, the structure is not provided with means for preventing a change in the urging force of the spring acting on the slide lever. As a result, a problem arise in terms of a practical use. That is, the urging force of the spring is determined by the length of its elongation in accordance with the degree of the rotation of the slide lever, the spring acting on the slide lever which is engaged to the cam surface so as to be rotated while moving in synchronization with the rectilinear motion of the lens housing in the direction of the optical axis of the lens. As a result, the quantity of force (driving force) necessary to rectilinearly move the lens housing at the time of opening/closing the barrier becomes inequal. Therefore, a user feels uneasy because the retraction/protraction action of the lens housing cannot be smoothly performed. In particular, since collapsible cameras of the type described above usually use an electric motor so as to retract/protract the lens housing, the above-described inequal force causes the load of the electric motor acting on the lens housing driving system to be changed. Therefore, a problem arises in that vibrations and noise generated in the motor and/or the gear configuration and the change in the driving speed of the lens housing can be perceived by a user. What is even worse, if the battery has been consumed, the output from the motor is lowered excessively, causing the lens housing to be stopped at an intermediate position. The change in the moving force exerts a bad influence upon the mirror housing driving system and the cam engagement portion. In particular, a partial and eccentric wear will deteriorate the durability, causing a critical problem to take place when used practically.

In particular, the above-described lens housing driving system and the barrier opening/closing mechanism must be able to smoothly operate while preventing the change in the load to be applied to the lens housing. In addition, there has been a desire to improve the durability of each of the above-described system and the mechanism. Thus, there arises a necessity of providing a structure capable of overcoming the above-described problems.

SUMMARY OF THE INVENTION

An object of the present invention is to provide a lens driving device capable of smoothly rectilinearly moving a lens group and reducing the length of a guide member, the lens driving device being for use in a camera the size and the thickness of which are reduced.

Another object of the present invention is to provide a reliable light leakage prevention device capable of overcoming the above-described problems.

A further object of the present invention is to provide an electric signal transmission device for a zoom lens or a multifocus lens camera in which an FPC for establishing a connection between an electric device provided for the camera housing and an electric device provided for the lens portion can be smoothly accommodated in such a manner that the image quality cannot be deteriorated by a ghost or obstruction.

A still further object of the present invention is to provide a barrier opening/closing mechanism for use in a collapsible camera with a barrier and capable of making the load to be substantially constant, the load acting on a cam surface of a barrier opening/closing cam for opening/closing the barrier disposed on the front surface of an imaging lens in synchronization with the protraction/retraction action of a lens housing.

In order to overcome the above-described problems, as shown in the drawings, an aspect of the present invention lies in a lens driving device comprising a holding member 5 for holding imaging lenses 14 and having a first helicoid 5a formed relative to the optical axis of the lenses 14a and 14b; a rotary member 6 having a second helicoid 6b which is arranged to engage to the first helicoid 5a, the rotary member being arranged to be engaged to the holding member 5 via the two helicoids 5a and 6b and rotatably supported relative to the optical axis to a camera housing 17; a guide member 12 which is provided for either of the holding member 5 or the camera housing 17 and which extends in the direction of the optical axis; and supporting members 25 and 26 provided for the residual one of the holding member 5 and the camera housing 17 to which the guide member is brought into contact, whereby the rotation of the holding member 5 is prevented by the contact between the guide member 12 and the supporting members 25 and 26 and allows the holding member 5 to rectilinearly move in the direction of the optical axis in accordance with the rotation of the rotary member 6. The guide member 12 has two parallel surfaces which are perpendicular to the tangent of a circle centering the optical axis. The supporting members 25 and 26 comprise a pair of annular bodies 25 each of which has a conical surface which is rotatable relative to an axis perpendicular to the optical axis. The supporting members 25 and 26 come in contact with the two parallel surfaces of the guide member 12 at the above-described conical surfaces.

According to the present invention, the rectilinear movement key of a camera can be shortened and the size and the thickness of the camera can thereby be reduced. Furthermore, since the rectilinear movement key serving as a guide member for rectilinearly moving the lens housing is in the form of a plate and has a proper elasticity, the parallelism of its two sides can be maintained even if it is deflected when the lens housing is rectilinearly moved. Furthermore, the supporting member which comes in contact with the parallel two surfaces is in the form of at least one pair of rollers having a rotatable conical surface. Therefore, a play or a catch can be prevented between the lens housing and the rectilinear movement key.

In order to overcome the above-described problems, an aspect of the present invention lies in a light leakage prevention device for a camera having a lens housing 5 which is able to project and move from an opening formed in a camera housing 17 in the direction of the optical axis, the light shielding device having a light shielding member 29 disposed in the opening of the camera housing 17 in such a manner that it comes in contact with the outer surface of the lens housing 5. Furthermore, a cylindrical portion 29b is disposed in the periphery of the light shielding member 29.

Furthermore, a light leakage prevention device is constituted in which one or more grooves 29d are formed in a portion in which the light shielding member 29 slides and comes in contact with the lens housing 5.

In addition, a light leakage prevention device is constituted in which the light shielding member is in the form of a plate ring made of an elastic material, the light shielding member 29 being integrally formed with a metal holding member 29e.

Since the light shielding member slides and comes in contact with the outer surface of the lens housing, light leakage taken place due to an eccentricity can be prevented. Therefore, the diagonal light can be stopped by the cylindrical portion disposed in the periphery portion. Since grooves are formed in the contact portion, the slide resistance can be reduced at the time of the rectilinear movement of the lens housing. In addition, sliding can be smoothly performed since the deformation of the light shielding member can be reduced.

In order to overcome the above-described problems, an aspect of the present invention lies in an electric signal transmission device for a camera including a camera housing 17; a holding member 5 for holding a lens and having a first helicoid 5a formed relative to the optical axis of the lens; a rotary member having a second helicoid 6b which is arranged to engage to the first helicoid 5a, the rotary member 6 being arranged to be engaged to the holding member 5 via the two helicoids and rotatably supported relative to the optical axis to the camera housing; a guide member 12 disposed on the inside of the rotary member 6 in such a manner that its end portion is secured to the camera housing 17 and the guide member extends from the position at which the end portion is secured to the camera housing in the direction of the optical axis, the guide member 12 converting the rotary motion of the rotary member 6 into a rectilinear motion of the holding member 5 in the direction of the optical axis; a first electric device supported by the camera housing 17; a second electric device supported by the holding member 5; and a flexible substrate 27 establishing an electrical connection between the first and second electrical devices, the electric signal transmission device comprising: a fastening portion 27d secured to the camera housing 17, a deflection portion 27c connected to the fastening portion 27d, an extension portion 27b connected to the deflection portion 27c and extending on the inside of the rotary member and another fastening portion 27a connected to the extension portion and secured to the holding member, wherein the extension portion 27b is disposed between the rotary member 6 and the guide member 12 in such a manner that the extension portion 27b is positioned in contact with the guide member 12 and is able to move on the guide member 12 when the holding member 5 rectilinearly moves.

Another aspect of the present invention lies in an electric signal transmission device wherein the deflection portion 27c is accommodated in a space formed outside the rotary member 6.

Another aspect of the present invention lies in an electric signal transmission device characterized in that the first electric device includes collimator means 31 and 32 having a light emitting portion 31 and a light receiving means and a photometry means disposed between the light emitting portion 31 and the light receiving portion 32, the space being a space formed between the light emitting portion 31 and the light receiving portion 32 and behind the photometry means.

According to the present invention, the flexible substrate is disposed between the rotary member and the guide member in such a manner that it is able to slide and its surface facing the optical axis is shielded by the guide member. Therefore, the image cannot be damaged due to the reflection of the diffused light.

Since the flexible substrate is deflected in a sufficiently large space disposed outside the rotary member, it does not obstruct the optical path and is not damaged due to excessive bending, causing the durability to be improved.

In order to overcome the above-described problems, an aspect of the present invention lies in an electric signal transmission device for a camera including a camera housing 17; a holding member 5 for holding a lens and having a first helicoid 5a formed so as to have an axial center corresponding to the optical axis of the lens; a rotary member 6 having a second helicoid 6b engaged with the first helicoid 5a in a screwing manner, the rotary member 6 being arranged to engage with the holding member through the two helicoids while being supported on the camera housing so as to be rotatable on the optical axis; a guide member 12 disposed on the inner circumferential side of the rotary member 6 in such a manner that its end portion is secured to the camera housing and that it extends from this secured portion in the direction of the optical axis, the guide member 12 converting the rotary motion of the rotary member 6 into a rectilinear motion of the holding member 5 in the direction of the optical axis; a first electric device supported on the camera housing 17; a second electric device supported by the holding member 5; and a flexible substrate 27 establishing an electrical connection between the first and second electrical devices. In this electric signal transmission device, the flexible substrate 27 includes a fastening portion 27d secured to the camera housing 17, a deflection portion 27c connected to the fastening portion 27d, an extension portion 27b connected to the deflection portion 27c and extending on the inner circumferential side of the rotary member and another fastening portion 27a connected to the extension portion and secured to the holding member. The extension portion 27b is disposed between the rotary member 6 and the guide member 12 in such a manner as to be in contact with the guide member 12 and to be able to slide on the guide member 12 when the holding member 5 moves rectilinearly. The deflection portion is accommodated in an accommodation chamber 31 provided on the outer circumferential side of the rotary member 6. There is also provided a limit member 17b for enabling formation of a deflected shape of the deflection portion 27c and for constantly limiting the direction of deflection thereof. The limit member 17b is formed integrally with a member forming the accommodation chamber 31.

According to the present invention, the flexible substrate is deflected in the sufficiently large accommodation chamber outside of the rotary member, the limit member constantly enables the deflection portion connected to the fastening portion defining one end of the flexible substrate to be formed into a deflected shape, and applies a force to the deflection portion such that the deflection portion can be turned smoothly and the direction of deflection is constantly limited.

The flexible substrate is comparatively reduced in length.

The limit member for enabling formation of the deflected shape is formed integrally with a member which forms the accommodation chamber.

Furthermore, an aspect of the present invention lies in a barrier opening/closing mechanism comprising a barrier opening/closing cam disposed in the camera housing. The barrier opening/closing cam has a cam lever disposed for opening/closing a lens protection barrier disposed on the front surface of an image lens, the cam lever being always rotatably urged by a spring in the direction in which the barrier is opened. The barrier opening/closing cam is further provided with a cam surface which is engaged to the cam lever by the movement of the cam lever in the direction of the optical axis of the lens so that the barrier is opened/closed. The cam surface of the barrier opening/closing cam is arranged to be formed in accordance with the magnitude of the urging force of the spring in such a manner that the angle of inclination is large in a range in which the urging force of the spring acting on the cam lever is large and the angle of inclination is small in a range in which the urging force is small.

According to the present invention, the angle of inclination is large in the portion in which the barrier opening/closing cam is engaged to the cam surface is large in a range in which the urging force of the spring acting on the cam lever is large. Therefore, the load at the time of the rectilinear movement of the lens housing can be reduced. In a range in which the urging force of the spring is small, the angle of inclination in the fastening portion is small. Therefore, the load to the lens housing can be made substantially the same as the above-described case. Therefore, a substantially constant load is able to act the driving system for rectilinearly moving the lens system regardless of the magnitude of the urging force of the spring acting on the cam lever.

Other and further objects, features and advantages of the invention will be appear more fully from the following description.

DETAILED DESCRIPTION OF THE PREFERRED EMBODIMENTS

Figure 1:
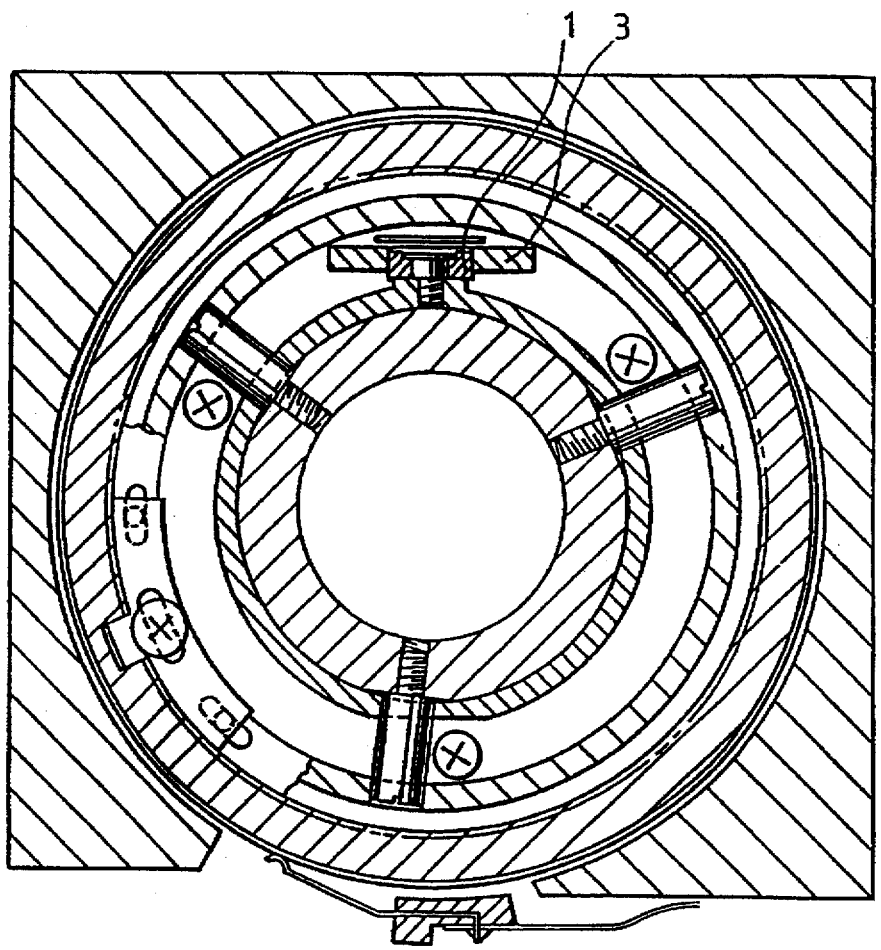
FIG. 1 is a cross sectional view which illustrates a conventional lens driving mechanism.
Figure 2A:
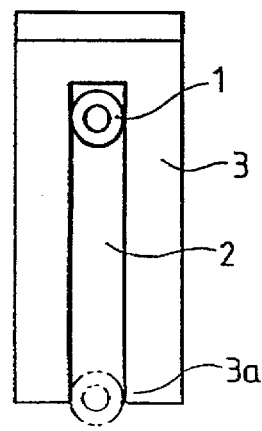
FIGS. 2A and 2B are plan views which respectively illustrate a conventional rectilinear movement key.
Figure 2B:
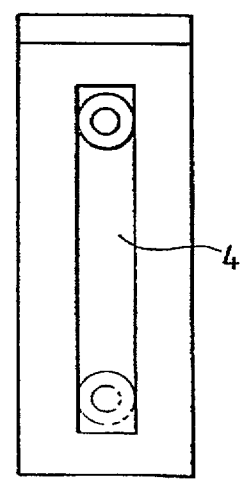
Figure 3:
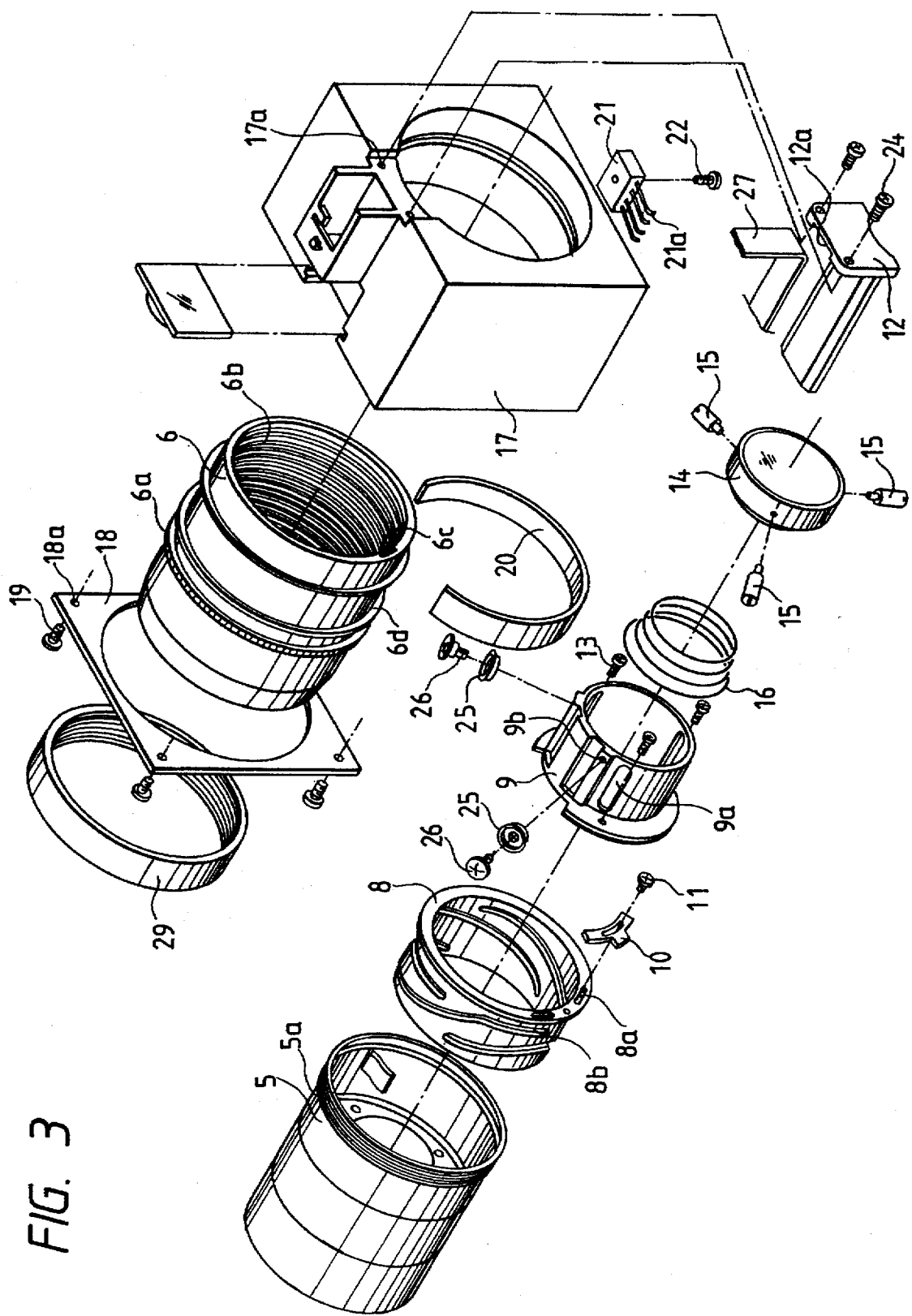
FIG. 3 is a perspective view which illustrates an embodiment of a front body and a lens driving mechanism according to the present invention.
Figure 4:
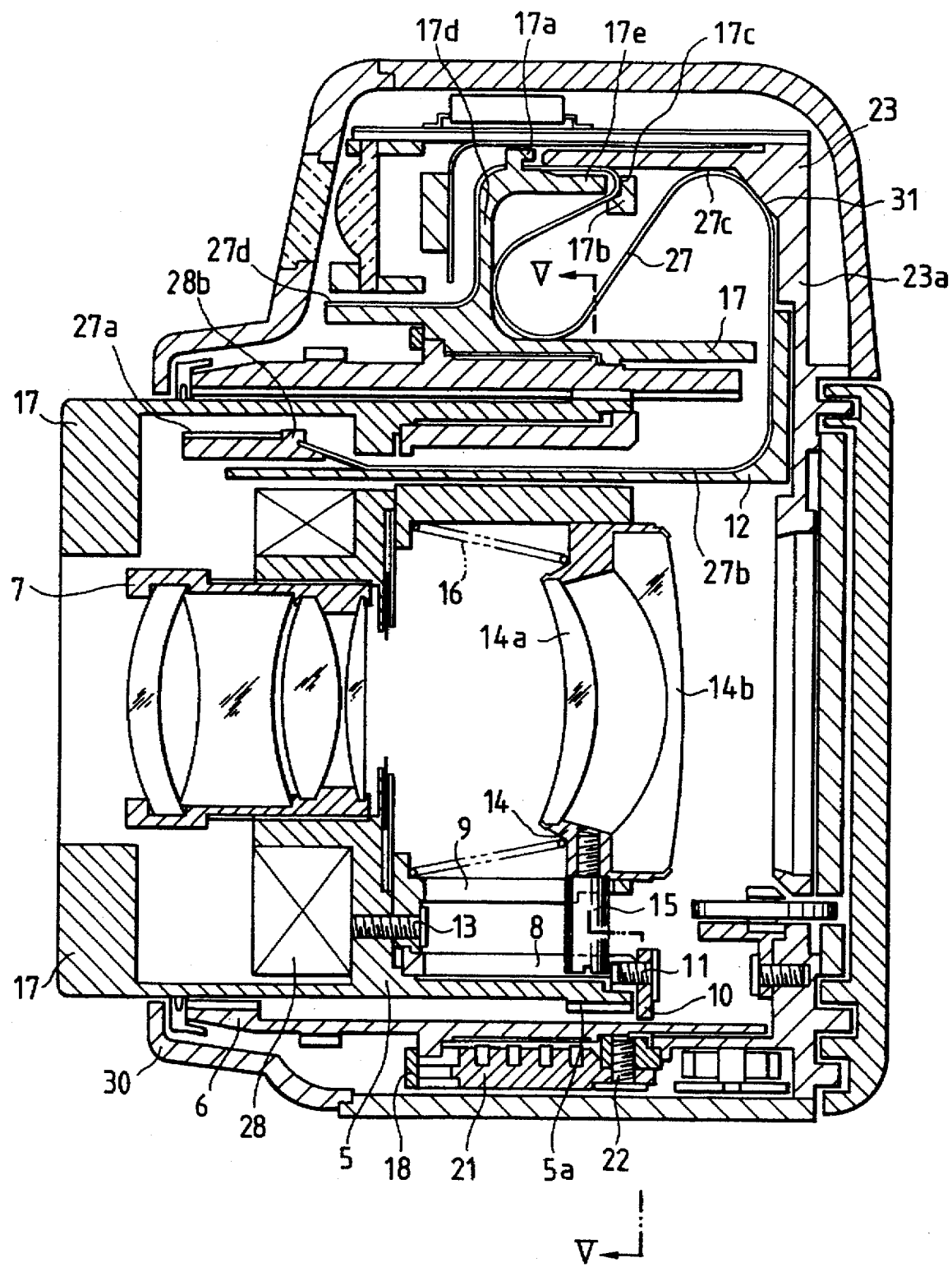
FIG. 4 is a vertical cross sectional view which illustrates a portion including the optical axis of a lens.
Figure 5:
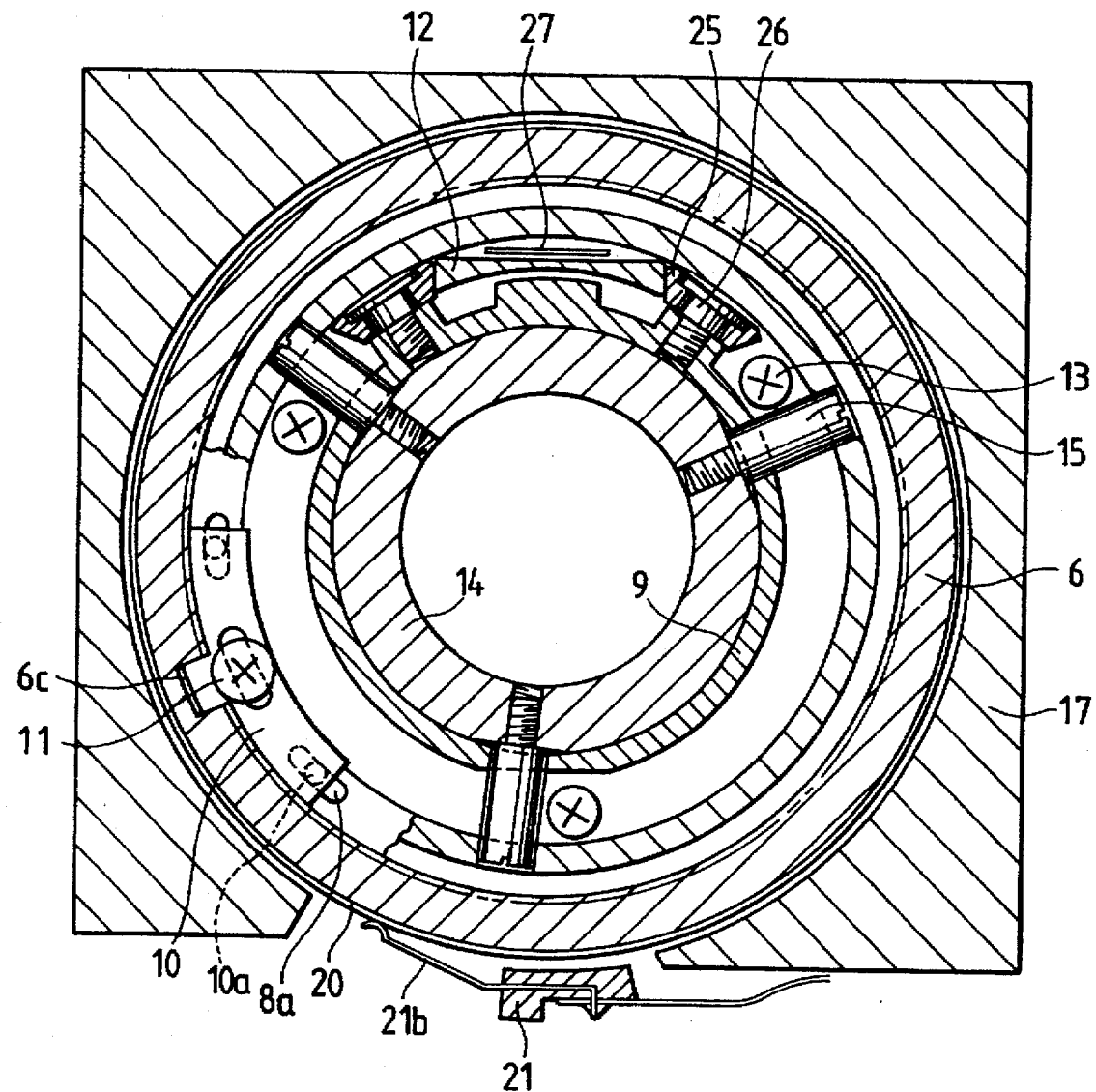
FIG. 5 is a cross sectional view taken along line V—V of FIG. 4.
Figure 6A:
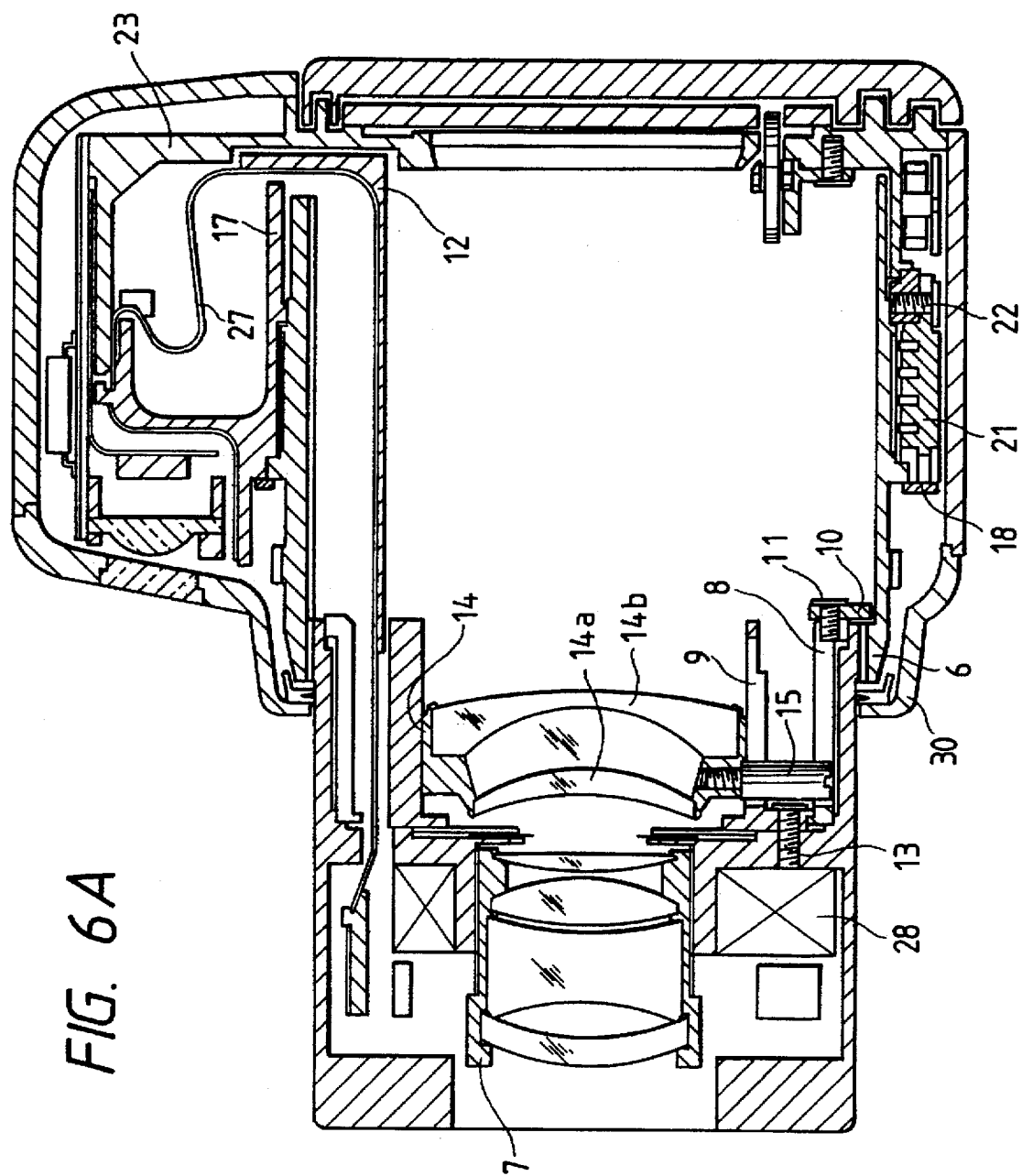
FIG. 6A is a cross sectional view which illustrates a lens driving mechanism at the telescoping position.

FIG. 3 is an exploded perspective view which illustrates a front housing and a lens driving mechanism according to an embodiment of the present invention. FIG. 4 is a vertical cross sectional view which illustrates a portion including the optical axis of a lens of a camera according to the same, wherein a wide angle position at which the lens has been retracted is illustrated. FIG. 5 is a cross sectional view taken along line V—V of FIG. 4 and illustrates the lens driving mechanism when viewed from a rear portion of the optical axis after the lens driving mechanism has been cut by a rear lens chamber including the rear guide pin. FIG. 6A is a vertical cross section which illustrates a camera including the optical axis of the lens, in which a telescopic position at which the lens has been protracted is illustrated.

A lens housing 5 is accommodated in an inner helicoid 6. A helicoid (rotary member) 5a formed on the outer surface of the lens housing 5 is engaged to another helicoid 6b formed on the inner surface of the inner helicoid 6. A front lens chamber 7 is accommodated in the forward inner portion of the lens housing 5 and a shutter (omitted from illustration) is disposed on the outside of the front portion of the lens housing 5.

A rear cam ring 8 is disposed inside the lens housing 5 and as well as on the outside of the rear rectilinear movement guide cylinder (guide member) 9 in such a manner that it can rotate. The rear cam ring 8 has, in the annular portion thereof, three cam grooves 8b each of which is diagonally formed in the circumferential direction. The rear cam ring 8 has two elongated holes 8a at the rear flat portion thereof. The elongated holes 8a form guide portions into which two round projection portions 10a formed on a clutch 10 can be movably introduced when the clutch 10 is brought into contact with the above-described rear flat portion of the rear cam ring 8.

The clutch 10 is fastened to the rear cam ring 8 by a fixing screw 11 whereby the position at which the clutch 10 is secured can be shifted by loosening the fixing screw 11 in a range of the elongated hole 8a formed in the rear cam ring 8. The clutch 10 is slidably fitted with the inner helicoid cylinder 6 at a linear groove 6c formed in the inner helicoid cylinder 6.

Three linear grooves 9a are formed in the rear rectilinear movement guide cylinder 9 at positions at which the circumference is divided into three sections. A flat slidable surface (omitted from illustration) which is arranged to slide on a rectilinear movement key (guide member) 12 is, in parallel to the optical axis, formed in the central portion of the outer surface of the rear linear guide cylinder 9. Furthermore, elongated portions (omitted from illustration) running parallel to the optical axis are respectively formed on the two sides of the slidable surface in the circumferential direction. The rear rectilinear movement guide cylinder 9 is fixed and thereby integrated with the lens housing 5 by rectilinear movement guide fixing screws 13.

A rear lens chamber 14 accommodates lenses 14a and 14b in a fixed manner. Three rear guide pins 15 are driven into the outer surface of the rear lens chamber 14 in the radial direction at positions which divide the circumference into three sections. The three rear guide pins 15 are respectively fitted within the cam grooves 8b formed in the rear cam ring 8 and the rectilinear movement grooves 9a formed in the rear rectilinear movement guide cylinder 9 so that a cam follower is established.

A rear play-prevention spring 16 presses each of the rear guide pins 15 to the rear wall of the cam grooves 8b so that the play of the rear lens chamber 14 in the direction of the optical axis is prevented.

The inner helicoid 6 is in the form of a cylinder and is accommodated in a cylindrical space formed in a front body 17 in such a manner that it is rotatably held in the front body 17 at an annular projection 6d formed on the outer surface of the inner helicoid 6 by a retaining plate 18 fixed by screws 19 which are inserted into screw holes 18a.

A flexible printed circuit (to be abbreviated to an "FPC" hereinafter) encoder FPC 20 is adhered to the outer surface of the inner helicoid 6 in such a manner that its encoder pattern (omitted from illustration) which is an electric contact faces outwards. An encoder brush 21 is fixed to the front body 17 by an encoder brush fixing screw 22 in such a manner that a contact 21a at each of the front portions of the encoder brush 21, through a cut portion in the lower portion of the front body 17, comes in contact with the encoder FPC 20 applied to the inner helicoid 6.

The rectilinear movement key 12 is in an elongated flat plate-like shape having parallel planes on the two sides thereof, the rectilinear movement key 12 being secured to a rear body 23 in an upper portion at an end portion thereof by rectilinear movement key fixing screws 24. The rectilinear movement key 12 serves as a guide member extending forwards between the rear cam ring 8 and the rear rectilinear movement guide cylinder 9 from the rear body 23 in parallel to the optical axis. The rectilinear movement key 12 is positioned on a smooth and flat portion on the top surface of the rear rectilinear movement guide cylinder 9 and is movably held between a pair of rollers provided for the rear rectilinear movement guide cylinder 9 in the direction of the optical axis.

Each roller 25 has a conical surface on the side thereof. A pair of the rollers 25 are respectively fastened by roller screws 26 inserted into roller screw holes 9b formed in two elongated portions of the rear rectilinear movement guide cylinder 9 in such a manner that each roller can freely rotate about the axis of the conical surface.

The pair of the rollers 25 are arranged in such a manner that they come in linear contact with the parallel planes on the two sides of the rectilinear movement key 12.

In the thus constituted structure, since the rectilinear movement key 12 elongates in the direction of the optical axis and has a reduced thickness, it vertically deflects when viewed in FIG. 5 by a load generated from the rollers 25 when the lens rectilinearly moves. Furthermore, each surface on which the rectilinear movement key 12 slides on a roller 25 is arranged to be parallel to the direction in which the rectilinear movement key 12 deflects. The reason for this lies in that generation of a play or a catch between the rectilinear movement key 12 and the rollers 25 must be prevented even if the rectilinear movement key 12 is vertically deflected. As a result, the positional deviation between the rectilinear movement key 12 and the rollers 25 generated due to the manufacturing error can be absorbed.

The shutter FPC 27 extends from a shutter driving member 28 positioned in the front portion on the outer surface of the lens housing 5, the shutter FPC 27 being positioned along the top surface of the rectilinear movement key 12 which extends forwards from the rear body 23, that is, the shutter FPC 27 being positioned toward the rear body 23. It is fitted within a rectangular groove 12a formed in the top portion of the rectilinear movement key 12. Furthermore, it is accommodated in an overlapped manner in a space formed between the front body 17 and the rear body 23.

Figure 7:
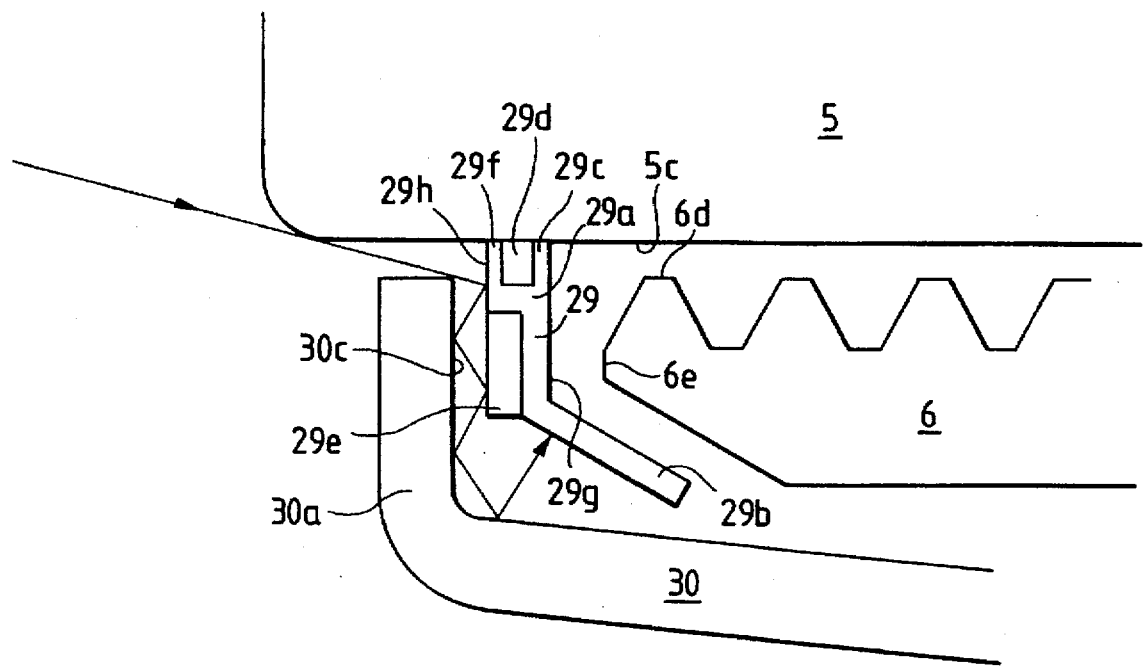
FIG. 7 is a cross sectional view which illustrates a light shielding member.
Figure 8:
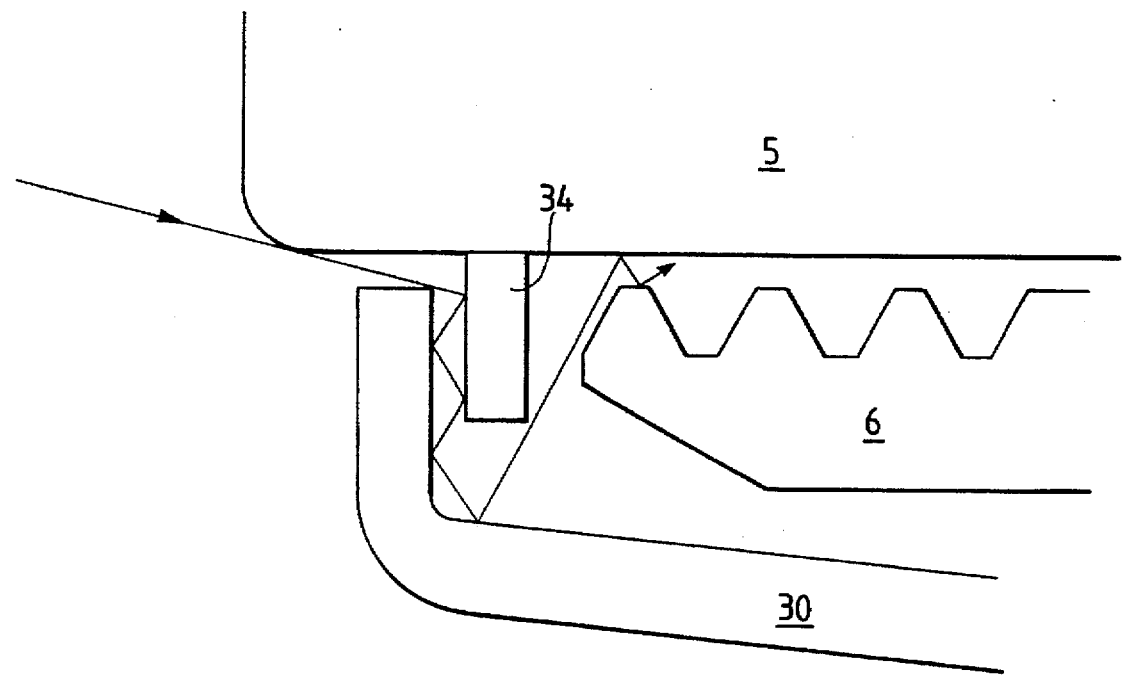
FIG. 8 is a schematic cross sectional view which illustrates another embodiment.

A light shielding member 29 is positioned in contact with the outer surface of the front portion of the lens housing 5. FIG. 7 is a cross sectional view of the light shielding member 29 and a portion including it. FIG. 8 is a cross sectional view which illustrates another example of the light shielding member 29.

The light shielding member 29 is a thin annular member having a large round hole formed in the central portion thereof, the light shielding member 29 comprising an annular disc portion 29a and a generally cylindrical flange portion 29b formed at the periphery of the disc portion 29a. The large round hole portion in the central portion of the disc portion 29a has a band portion 29c and a groove portion 29d formed in the direction toward the lens housing 5. The light shielding member 29 is arranged in such a manner that its holding member 29e is positioned more adjacent to the optical axis than the periphery of the disc portion 29a and farther from the optical axis than the band portion 29c and the groove portion 29d, the holding member 29e being integrally formed with the disc portion 29a.

The light shielding member 29 is disposed in such a manner that it can slide around the outer surface 5c of the front portion of the lens housing 5 at a top 29f of the band portion 29c. Furthermore, the light shielding member 29 is positioned in contact with a front surface 6e of the inner helicoid 6 at a surface 29g of the disc portion 29a adjacent to the inner helicoid 6 in such a manner that it can separate from the same. The light shielding member 29 is, at a side surface 29h of the disc portion 29a adjacent to the side portion 30a of the front cover 30 adjacent to the subject, positioned in contact with an inner surface 30c of the side portion 30a of the front cover 30 adjacent to the subject in such a manner that it can separate from the same.

The light shielding member 29 is made of silicone rubber and is fitted around the lens housing 5 at its front outer surface 5c due to the elasticity thereof. Therefore, the diameter of the round hole formed at its central portion is smaller than the outer diameter of the lens housing 5 by about 0.2 mm when measured in such a manner that the light shielding member 29 does not come in contact with the front outer surface 5c.

The thickness of the disc portion 29a of the light shielding member 29 in the direction of the optical axis is about 0.8 mm, the thickness of the band portion 29c in the same direction is about 0.2 mm and the degree of the eccentricity is about 0.2 to 0.3 mm.

The reason why the light shielding member is made of silicone rubber and is positioned about the front outer surface 5c of the lens housing 5 in such a manner that it is positioned in contact with the same lies in that the pressure of the light shielding member 29 against the front outer surface 5c must be made constant so as to prevent the light leakage due to the change in the pressure. That is, in the case where the light shielding member 29 is provided for the inner helicoid 6, the inner helicoid is necessarily rotated. Therefore, if there is an eccentricity between the lens housing 5 and the inner helicoid 6, the pressure of the light shielding member 29 against the lens barrel 5 is inevitably changed. As a result, a gap is undesirably formed between the above-described two members. Therefore, the light leakage cannot be perfectly prevented.

Figure 9:
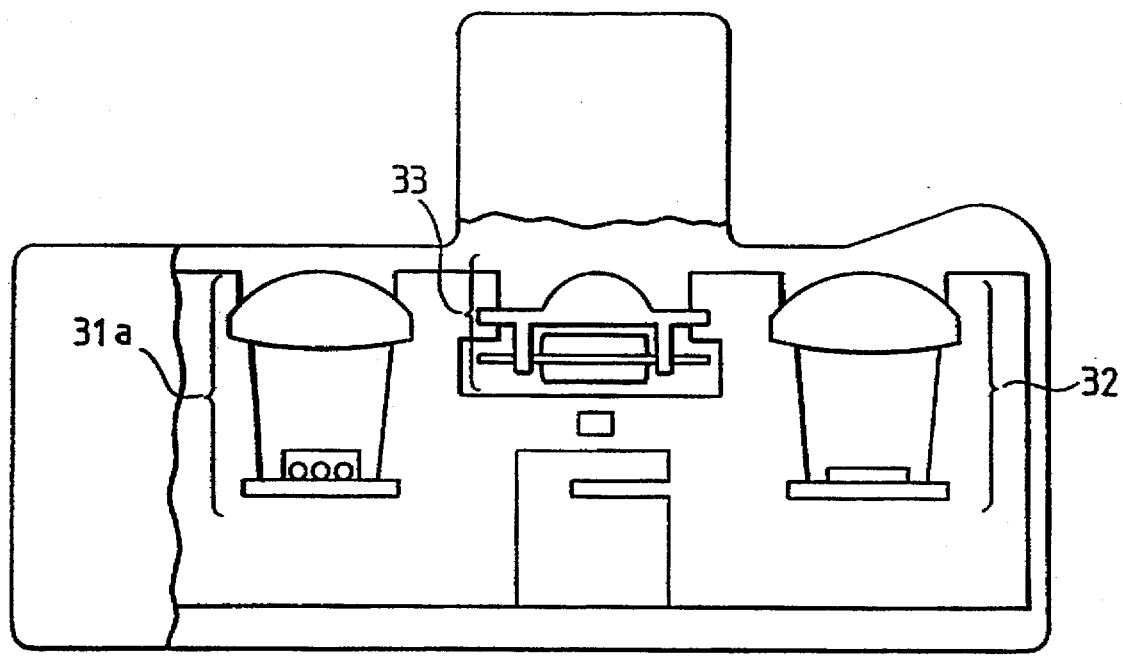
FIG. 9 is a plan view which illustrates a camera.

The shutter FPC 27 is, at its end portion 27a, fixed by a projection 28b formed on the shutter driving member positioned on the front outer surface of the lens housing 5. Its elongated portion 27b is elongated from the shutter driving member 28 and is positioned between the rectilinear movement key 12 and the inner helicoid 6, the rectilinear movement key 12 being arranged in such a manner that an end portion is secured to the rear body 23 and extends. The shutter FPC 27 extends forward along the top surface of the rectilinear movement key 12 in the rearward direction, that is, toward the rear body 23. At the end portion of the rectilinear movement key 12, it is fitted within a gap formed in the rectangular groove 12a at the upwardly slanted portion which is continued to the end portion of the rectilinear movement key 12. Furthermore, its deflection portion 27c is, without being bent and thereby in a smooth shape, accommodated in a space formed between the front body 17 and the rear body 23. The space formed between the front body 17 and the rear body 23 serves, as is shown from FIG. 9 which is a plan view of the camera, as a marginal space at the time of mounting the electric elements, the space being disposed between a light emitting portion 31a and a light receiving portion 32 which constitute the collimator means and behind a photometry means 33. The shutter FPC 27 is secured at a projection portion 17a formed on the front body 17, while another end portion 27d is introduced and connected to a control portion (omitted from illustration).

The space (accommodation chamber) formed between the front body 17 and the rear body 23 is formed by an accommodation chamber member 17d which is a part of the front body 17, and is closed at the rear side by an accommodation chamber rear wall member 23a which is a part of the rear body 23. These members are integrally formed with high accuracy such that their portions contacting the two side surfaces of the shutter FPC 27 are smoothly formed without any joint. Inner side walls (not shown) of the accommodation chamber 31 are spaced by a distance close to the width of the shutter FPC 27 such that the shutter FPC can move smoothly on them. The shutter FPC 27 is thereby prevented from moving laterally and can be smoothly inserted in or drawn out of the the accommodation chamber 31.

An FPC limit member 17b is fixedly provided integrally with upper side wall portions of the accommodation chamber member 17d so as to extend inwardly therefrom like a beam perpendicular to the optical axis and parallel to the surface of the rectilinear key 12.

An eave 17e is fixedly provided integrally with an upper fore wall portion of the accommodation chamber member 17d so as to extend rearwardly and to face the FPC restraining member 17b.

The FPC limit member 17b has a slant surface portion 17c facing the eave 17e. The slant surface portion 17c has a smooth recessed surface extending straight in the longitudinal direction. If this smooth recessed surface is approximated to a circularly cylindrical surface, the radius of curvature of this cylindrical surface is about 2 mm or longer. If it is smaller than 2 mm, the shutter FPC 27 cannot be smoothly curved along the slant surface and is sharply bent so as to be creased always at the same position.

The shutter FPC 27 is fixed at a projection 17a and its portion located at the rear of this projection is led between the eave 17e and the FPC restraining member 17b and is smoothly bent downwardly and forwardly along the slant surface portion 17c.

Referring to FIG. 4 which is a cross sectional view of the lens at the wide angle imaging operation in which the lens housing is retracted maximum, the shutter FPC 27 is fully expanded in the cross sectional space formed between the front body 17 and the rear body 23. However, referring to FIG. 6A which is a cross sectional view of the lens at the telescopic imaging operation in which the lens housing is protracted maximum, the shutter FPC 27 is not expanded fully in the cross section of the space formed between the front body 17 and the rear body 23 since the looseness is reduced by a degree which corresponds to the forward movement of the shutter FPC 27, causing a marginal space to be formed.

Now, the operation of this embodiment will be described.

A motor (omitted from illustration) provided in the camera housing is operated in response to a signal issued from a focal point detection device (omitted from illustration), which is individually provided, the signal denoting a command of forwards/rearwards moving the lens group. A drive gear (omitted form illustration) connected to the above-described motor is rotated in response to the above-described command. Since a major gear 6a formed on the outer surface of the inner helicoid 6 is engaged to the above-described drive gear, the inner helicoid 6 and the encoder FPC 20 applied to the outer surface of the inner helicoid 6 are integrally rotated when the motor is rotated. At this time, the encoder pattern (omitted from illustration) formed on the surface of the encoder FPC 20 is electrically connected due to the slide contact of the encoder brush front portion 21a provided for the encoder brush 21. As a result, the rotational angle of the inner helicoid 6 can be detected in accordance with the fact whether or not the circuit is opened. After the inner helicoid 6 has rotated by an angular degree which corresponds to the above-described command, a stop signal is transmitted so that the rotation of the motor is stopped and the rotations of the other elements connected to the motor are stopped.

When the inner helicoid 6 commences to be rotated, the lens housing 5 commences to be rotated via the helicoid 6b and the helicoid 5a which is engaged to the helicoid 6b. However, the rotation of the lens housing 5 is restricted by the rectilinear movement key 12 as described above, and it therefore performs only a rectilinear movement motion along the optical axis.

When the inner helicoid 6 is rotated, the rear cam ring 8 is engaged to the rectilinear movement groove 6c so that the rear cam ring 8 is rotated together with the inner helicoid 6 via the clutch 10, which is engaged to the rear cam ring 8.

The rotation of the rear rectilinear movement guide cylinder 9 is restricted by the rectilinear movement key 12 which is held by the pair of rollers 25 which are fixed by the screws. As a result, the rear rectilinear movement guide cylinder 9 performs only the rectilinear movement. Since the side surface of the rollers 25 are in the form of a cone, the rollers 25 freely rotate at the time of the forward/rearward movement of the rectilinear movement guide cylinder 9. The side surfaces of the rectilinear movement key 12 are held by the rollers 25 which are positioned on the two sides thereof and which rotate so as to form parallel planes. Therefore, the rectilinear movement key 12 comes in contact the rear rectilinear movement guide cylinder 9 so that it is rectilinearly guided via the rollers 25. Since the rectilinear movement key 12 has proper elasticity, the two side surfaces maintain the parallelism even if they are deflected in parallel to each other. As a result, the linear contact with the rollers 25 can be maintained satisfactorily. Furthermore, since the rear rectilinear movement guide cylinder 9 is secured to lens housing 5 by the rear rectilinear movement guide cylinder fixing screws 13, they are able to integrally rectilinearly move.

When the rear cam ring 8 is rotated, its rotation is transmitted to the rear lens chamber 14 via the rear guide pins 15 which are inserted into the cam grooves 8b. However, its rotation is limited by the rectilinear movement grooves 9a formed in the rear rectilinear movement guide cylinder 9 into which the rear guide pins 15 are inserted. Therefore, the rear lens chamber 14 is only rectilinearly moved. The reason for this lies in that the rotation of the rear rectilinear movement guide cylinder 9 is restricted by the rectilinear movement key 12. The rear lens chamber 14 performs a relative rectilinear movement with respect to the rear rectilinear movement guide cylinder 9 in accordance with the movement of the cam grooves 8b. Therefore, the positional relationship between the front lens group which is integrally rectilinearly moved together with the lens housing 5 and the rear lens group is changed to a predetermined interval. As a result of this, zooming is performed. At this time, since the rear lens chamber 14 is always pressed against the rear wall of the cam grooves 8b by the rear play prevention spring 16, the fitting of the cam grooves 8b to the rear guide pins 15 may be performed while maintaining a sufficient margin. The shutter FPC 27 extends from the shutter driving member 28 disposed in the lens housing 5 and slides upwards on the top surface of the rectilinear movement key 12 along the rear body 23. Furthermore, it has a loose portion in the space formed between the front body 17 and the rear body 23. Therefore, the length of the shutter FPC 27 can be automatically adjusted in accordance with the forward/rearward movement of the lens housing 5 in such a manner that the length of protraction is enlarged and the loose portion is shortened when the lens housing 5 has been protracted. Furthermore, when the lens housing 5 is retracted, the length of the protraction is shortened and the loose portion is elongated.

The lens housing 5 is deeply retracted into the camera housing through the opening portion formed in the camera housing at the time of the wide angle imaging operation. Since the light shielding member 29 surrounds and comes in contact with the lens housing 5 at this time, it is retracted together with the lens housing 5 due to the slide resistance. The distance of the retraction is restricted by the inner helicoid 6 to be shorter than the lens housing 5. As a result, it comes in contact with the front surface 6e of the inner helicoid 6 on the surface 29g of the disc portion 29a adjacent to the inner helicoid 6.

At the time of the telescopic imaging operation, the lens housing 5 protracts from the camera housing through the opening portion formed in the camera housing. At this time, since the light shielding member 29 comes in contact around the outer surface of the lens housing 5, it moves forwards together with the lens housing 5 due to the slide resistance. The distance of the forward movement is restricted by the front cover 30 to be smaller than the lens housing 5. As a result, the light shielding member 29 comes in contact with the inner surface 30c of the side portion 30a of the front cover 30 adjacent to the subject at its side surface 29h adjacent to the portion 30a of the front cover 30 adjacent to the subject.

At the time of the telescopic imaging operation, the lens housing 5 moves forwards before the light shielding member 29 comes in contact with the front cover 30. As a result, a gap is formed between the light shielding member 29 and the lens housing 5. Since the cam 8 has three diagonal cam grooves 8b in the circumferential direction and the rear rectilinear movement guide cylinder 9 has three rectilinear movement grooves 9a at positions at which the circumference is divided into three sections, light from the above-described gap is able to leak through the above-described grooves.

FIG. 8 is a schematic cross sectional view of an example arranged in such a manner that a light shielding member 34 is not provided with a cylindrical portion. Therefore, light diagonally or perpendicularly made incident or dispersed cannot be stopped. As a result, light leakage cannot be prevented.

FIG. 7 is a cross sectional view of the light shielding member according to this embodiment of the present invention.

As shown in FIG. 7, in the light shielding member 29 having the cylindrical portion 29c according to the present invention, the edge 29b of the cylindrical portion 29c is introduced into the gap between the inner helicoid 6 and the front cover 30. Therefore, the diagonal or vertical incident or scattering light with respect to the optical axis is stopped.

Therefore, the cylindrical portion 29c must have a size which is sufficient to shield the gap between the inner helicoid 6 and the front cover 30.

In the above-described structure, the light shielding member 29 is slidable and comes in contact with the lens housing 5 at a round hole having a relatively smaller diameter. Therefore, it clamps the lens housing 5 with a small constant force without an influence of the eccentricity taken place at the time of the manufacturing or the assembling work.

The light shielding member 29 is integrally formed by using rubber of a good quality and a rigid body and the two band portions are formed on the lens housing 5 with respect to the groove. Therefore, it can be elastically deformed by a constant pressure and slide by a small load.

The extension portion 27b of the shutter FPC 27 extends along the top surface of the rectilinear movement key 12 toward the rear body 23 from the projection portion 28b formed in the shutter driving member 28 to which an end portion of the shutter FPC 27 is secured. At the end portion of the rectilinear movement key 12, it is disposed upwards in the gap formed in the rectangular groove 12a. Then, it is accommodated in a smooth shape in the space formed between the front body 17 and the rear body 23 in such a manner that the deflection portion 27c is not bent. The shutter FPC 27 slides in the rectilinear movement key 12 and the rectangular groove 12a when the lens housing 5 moves forwards/rearwards.

At the time of the wide angle imaging operation in which the lens housing 5 is retracted maximum, the shutter FPC 27 is fully expanded in the cross section of space formed between the front body 17 and the rear body 23. However, at the time of the telescopic imaging operation in which the lens housing 5 is protracted maximum, the shutter FPC 27 is protracted so that the looseness in the space formed between the front body 17 and the rear body 23 is reduced.

As shown in FIG. 4 with respect to a cross section of the lens, when the lens barrel is positioned for wide angle shooting, the shutter FPC 27 is accommodated in the interior space of the accommodation chamber 31 formed between the front body 17 and the rear body 23 in such a manner as to meander largely as viewed in the cross section.

At this time, as in the case of telephoto shooting, the shutter FPC 27 is fixed at the projection 17a, its portion located at the rear of this projection is led between the eave 17e and the FPC limit member 17b and is forced forwardly by the slant surface portion 17c of the FPC limit member 17b, and a force is applied constantly and forwardly to the shutter FPC 27. The shutter FPC 27 is smoothly bent forwardly and downwardly by the slant surface portion 17c, extends forward to a full extent such as to contact the fore wall of the accommodation chamber 31 and then the lower wall, and is then led rearwardly. Since in this case the deflection portion 27c is long, this portion extends rearwardly and fully in the accommodation chamber 31 to reach an upper rear portion of the same and to contact the rear body 23, and is led to the gap of a rectangular groove 12a.

When the lens barrel is positioned for telephoto shooting, the shutter FPC 27 is fixed at the projection 17a, its portion located at the rear of this projection is led between the eave 17e and the FPC limit member 17b to be turned downward and is forced forwardly while being further turned by the slant surface portion 17c of the FPC limit member 17b, and a force is applied constantly and forwardly to the shutter FPC 27. The shutter FPC 27 is bent forcibly and smoothly to be turned forwardly and downwardly along a smoothly curved surface of 2 mm or more in terms of radius of curvature of the slant surface portion 17c, but it is led rearwardly without contacting the fore wall of the accommodation chamber 31. Since in this case the deflection portion 27c is short, this portion does not extend fully in the accommodation chamber 31 while extending rearwardly and does not contact the upper rear potion of the rear body 23, and is led to the gap of the rectangular groove 12a.

Figure 6B:
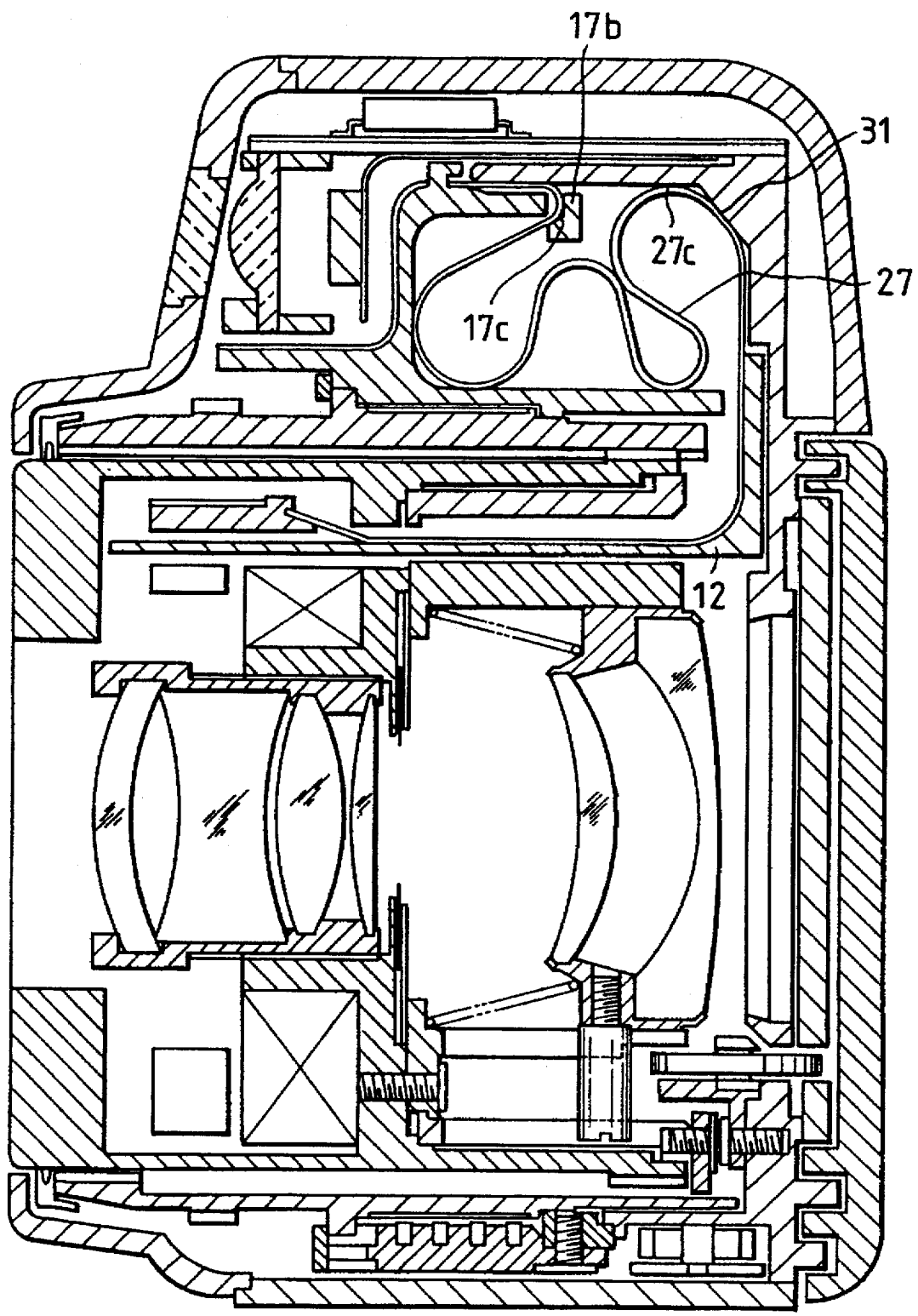
FIG. 6B is a longitudinal cross-sectional view including the optical axis of the lens in a state where the power source is turned off.

As shown in FIG. 6B with respect to a longitudinal cross section of the lens containing the optical axis, when the power source is turned off, that is, when the lens barrel is retracted to the innermost position, the shutter FPC 27 extends fully in the interior space of the accommodation chamber 31 formed between the front body 17 and the rear body 23 while meandering and folding up several times as viewed in the cross section.

At this time, as in the case of telephoto shooting, the shutter FPC 27 is fixed at the projection 17a, its portion located at the rear of this projection is led between the eave 17e and the FPC restraining member 17b and is forced forwardly by the slant surface portion 17c of the FPC limit member 17b, and a force is applied constantly and forwardly to the shutter FPC 27. The shutter FPC 27 is smoothly bent forwardly and downwardly by the slant surface portion 17c, extends forward to a full extent such as to contact the fore wall of the accommodation chamber 31 and then the lower wall, and is then led rearwardly. Since in this case the deflection portion 27c is long, this portion is further bent two times to form a loop without extending straight to the rear, then extends fully to the upper rear portion of the accommodation chamber 31, contacts the rear body 23, and is led to the gap of a rectangular groove 12a.

Thus, the formation of a suitable deflected shape enabled by the slanted surface portion 17c of the FPC limit member 17b ensures that even when the power source is turned off and when the greater part of the shutter FPC 27 is retracted in the accommodation chamber 31, the shutter FPC 27 is not sharply bent or twisted and is not reversely turned to the rear. A sufficient space for accommodation of the shutter FPC 27 is thus provided and the shutter FPC 27 can be accommodated regularly.

In the case where the number of the lens group exceeds 3, the same effect can, of course, be obtained from a similar structure. In a multifocus lens having no zooming function, the shutter FPC 27 is arranged to be a similar structure and smoothly slides on the rectilinear movement key 12 before it is accommodated in the upper space.

According to this embodiment, the structure is arranged in such a manner that the supporting member which comes in contact with the two parallel surfaces of the rectilinear movement key for rectilinearly moving the lens housing is arranged to be a pair of rotatable rollers each of which has a conical surface. Therefore, there is provided a lens driving device which can be suitably provided for a camera the size and the thickness of which are desired to be reduced.

Furthermore, since the lens groups are able to smoothly rectilinearly move at the time of changing the focal distance, the deterioration in the image quality due to the defective slide can be prevented and the power consumption can be reduced.

In addition, since the front lens housing and the rectilinear movement key are not coupled to each other by using a hole, an eccentric fuzziness due to a catch can be prevented.

Furthermore, the accuracy necessary to manufacture the rectilinear movement key and the rollers and the like can be made suitable.

In a multifocus lens having no zooming function, the movements of the rectilinear moving lens groups can be smoothly completed with a similar structure.

The degree of the parallelism of the two side surfaces of the rectilinear movement key 12 is sufficient if the rotation of the rear rectilinear movement guide cylinder 9 can be restricted and the sliding operation can be performed without occurrence of a looseness and the catch at the time of the rectilinear operation. Therefore, the necessary accuracy level can be lowered. In addition, each of the planes can be dissociated from a plane.

According to this embodiment, the light shielding member made of silicone rubber is positioned in contact with the outer surface of the lens housing, and the light leakage due to the eccentricity taken place at the time of the manufacturing or assembling work can be prevented.

Furthermore, since the cylindrical portion is provided in its periphery, the diagonal or vertical light incidence can be prevented.

In addition, since the light shielding member is integrally formed with a rigid body by using silicone rubber and it slides on the surface having the groove portion and the band portion, the slide resistance can be reduced at the time of the rectilinear movement of the lens housing and the load at the time of driving the lens housing can be also reduced.

Furthermore, the manufacturing accuracy for the elements can be made suitable and the assembling of these elements can be easily completed, causing the manufacturing cost to be reduced.

According to this embodiment, the light diffusion to the film surface due to the light reflection on the FPC can be prevented and the obstruction of the optical path can be perfectly prevented.

Since the FPC can be accommodated in a sufficiently large space and is not bent excessively, the durability can be improved.

Furthermore, the marginal space which is provided for mounting the electric elements and which is positioned between the light emitting portion and the light receiving portion of the collimator means and behind the photometry means can be efficiently utilized.

Since the necessity of the coating work or the like necessary to prevent the reflection on the FPC can be eliminated, the manufacturing cost can be reduced.

Furthermore, in the conventional structure, a member for guiding the FPC must be provided separately from the rectilinear movement key. However, since in the invention the guide member can be arranged to act as the rectilinear movement key, the manufacturing cost can be reduced.

According to the present invention, the flexible substrate can be bent in the accommodation chamber outside the rotary member, which chamber has a sufficiently large interior space, and the limit member for always enabling formation of a deflected shape of the flexible substrate limits the direction of deflection of the deflection portion of the shutter FPC connected to the fixed end portion of the same. The deflected portion can therefore be accommodated always regularly at the time of telephoto or wide angle shooting or even in the power-off state.

The shutter FPC is free from damage due to forcible bending or the like and is therefore improved in durability.

The length of the shutter FPC is limited, which effect enables a reduction in cost.

Since the limit member for formation of a deflected shape is formed integrally with the member forming the accommodation chamber, it is improved in accuracy and enables the shutter FPC to be bent smoothly while avoiding any increase in cost.

FIGS. 10 to 13 respectively illustrate an embodiment of a collapsible camera with a barrier to which a barrier opening/closing mechanism according to the present invention is applied. First, the schematic structure of the lens housing portion of the camera will be briefly described with reference to FIG. 10. Reference numeral 5 represents a lens housing in which imaging lens groups (omitted from illustration) are included. The lens housing 5 has an inwardly-directed flange 5b formed at its front end portion thereof, the flange 5b having a barrier operation ring 35 and two barriers 36 which can be opened/closed due to the rotation motion of the barrier operation ring 35 in such a manner that the two barriers 36 cover the above-described imaging lens group. The two barriers 36 are disposed in such a manner that they can rotate and swing. Furthermore, the front end portion of each of the barriers 36 is covered by a front ring 37 which is fixed to the lens housing 5 by a screw so that the two barriers 36 are integrally and rotatably fastened in a space in the front end portion of the lens housing 5.

The barrier driving ring 35 comprises a cam lever 38 projecting from a portion thereof into the lens housing 5 along the direction of the optical axis of the lens and a spring retainer 35a which projects on the periphery of the same. The barrier driving ring 35 is rotatably disposed in the front cylindrical portion 5c of the lens housing 5. The cam lever 38 is inserted into the lens housing 5 via a circular arc groove 5d formed in the inwards-directed flange 5b in such a manner that the cam lever 38 can be rotated by a predetermined angular degree. A cam surface 39a to be described later is formed at the front end portion of a barrier opening/closing cam 39 which projects along the inner surface of the lens housing 5 in the direction of the optical axis of the lens, the base portion of the barrier opening/closing cam 39 being fixed, by screws, from the back side of a black box 17 which constitutes a portion of the camera housing. The cam surface 39a is arranged so as to confront the cam lever 38. The above-described cam lever 38 and the cam surface 39a are arranged to selectively engage to each other at the time of the protraction/retraction of the lens housing 5.

A spring 40 is fitted to the spring retainer 35a of the barrier operating ring 45, the spring 40 always urging the barrier operating ring 45 in the direction (designated by an arrow a) in which the barriers 36 are opened. The other end portion of the spring 40 is fitted to a spring retainer 5e which projects on the inwards-directed flange 5 of the lens housing 5. Reference numeral 5f represents a stop which projects to the inner periphery of the inwards-directed flange 5b and which holds the barrier operating ring 35 while having the barrier operating ring 35 rotatably supported by a guide cylinder portion 5g.

Two fastening claws 35b, which are fastened to fastening pins 36b projecting adjacent to rotational shafts 36a which correspond to the inwards-directed flanges 5b of the barriers 36, are disposed at two opposing positions on the outer periphery of the barrier operating ring 35. As a result, the urging force of the spring 40 at the time of the engagement is made to act on the barriers 36. Reference numeral 5h represent bearings of the rotational shafts 36a provided for the inwards-direction flange 5b so that each of the barriers 36 is supported rotatably relative to the above-described bearings 5h. Reference numeral 41 represents coil springs wound around the front portions of the above-described rotational shafts 36a. The coil springs 41 are disposed between the above-described fastening pins 36b and the front cylinder portion 5c of the lens housing 5. As a result, the barriers 36 are urged in the directions designated by arrows b, that is, in the closing direction (see FIGS. 11 and 12).

Figure 10:
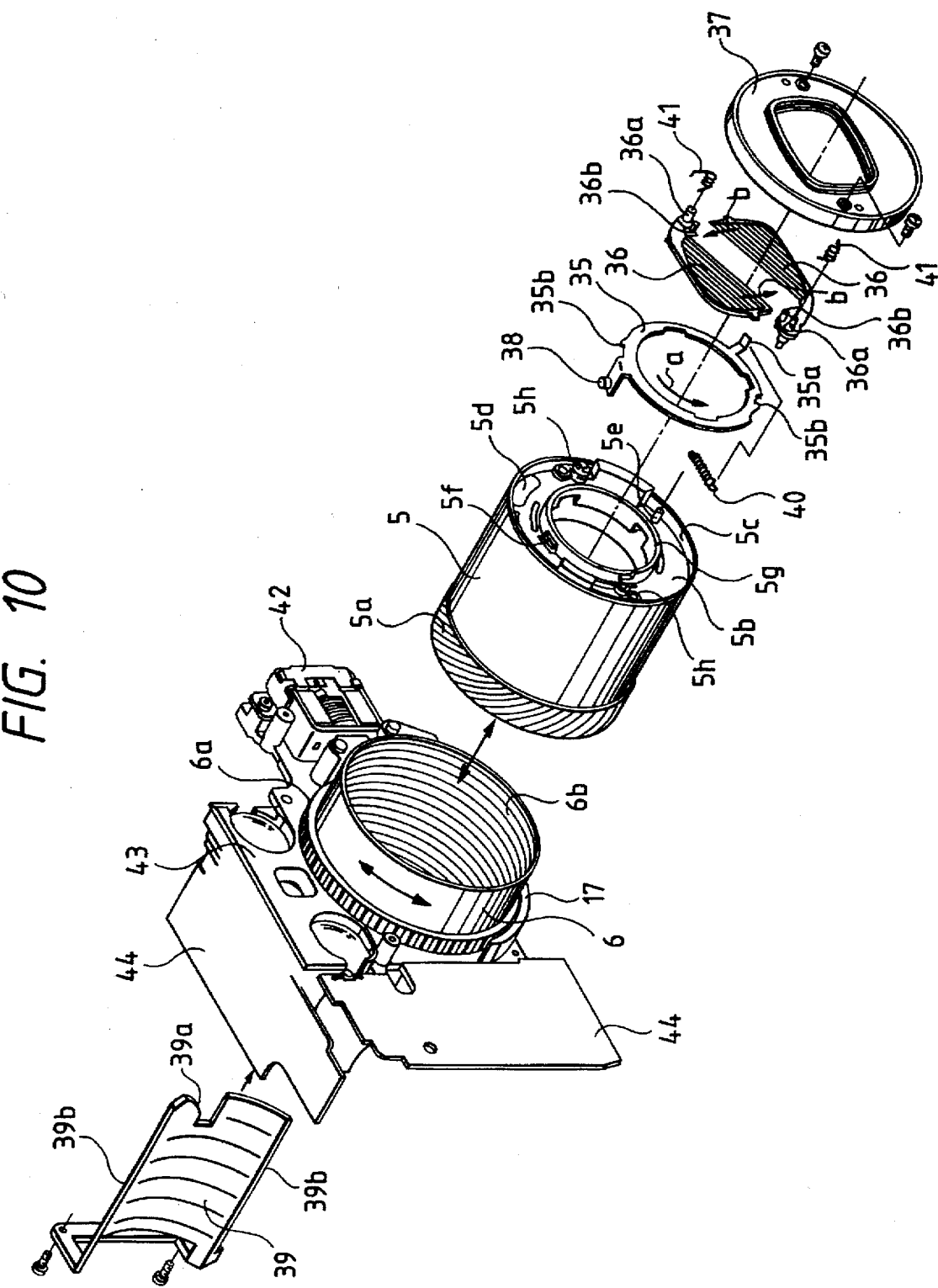
FIG. 10 is a schematic exploded perspective view which illustrates a lens housing portion of a collapsible camera with a barrier according to an embodiment of a barrier opening/closing mechanism according to the present invention.

The helicoid 5a, which is engaged to the helicoid 6b formed on the inner surface of the intermediate helicoid 6 which is rotatably supported adjacent to the black box 17, is formed on the outer surface at the rear end of the lens housing 5. Furthermore, the rotational force from an electric motor 42 transmitted via a gear configuration (omitted from illustration) is arranged to be transmitted to the gear portion 6a formed on the outer surface of the intermediate helicoid 6. As a result, the above-described lens housing 5 is protracted/retracted by the engagement of the helicoids 5a and 6b. The lens housing 5 is constituted in such a manner that it does not rotate but only rectilinearly moves by the rectilinear movement guide portion 39b of the barrier opening/closing cam 39. In FIG. 10, reference numeral 43 represents an AF.AE portion formed in the black box 17 and 44 represents a printed circuit board.

Figure 13:
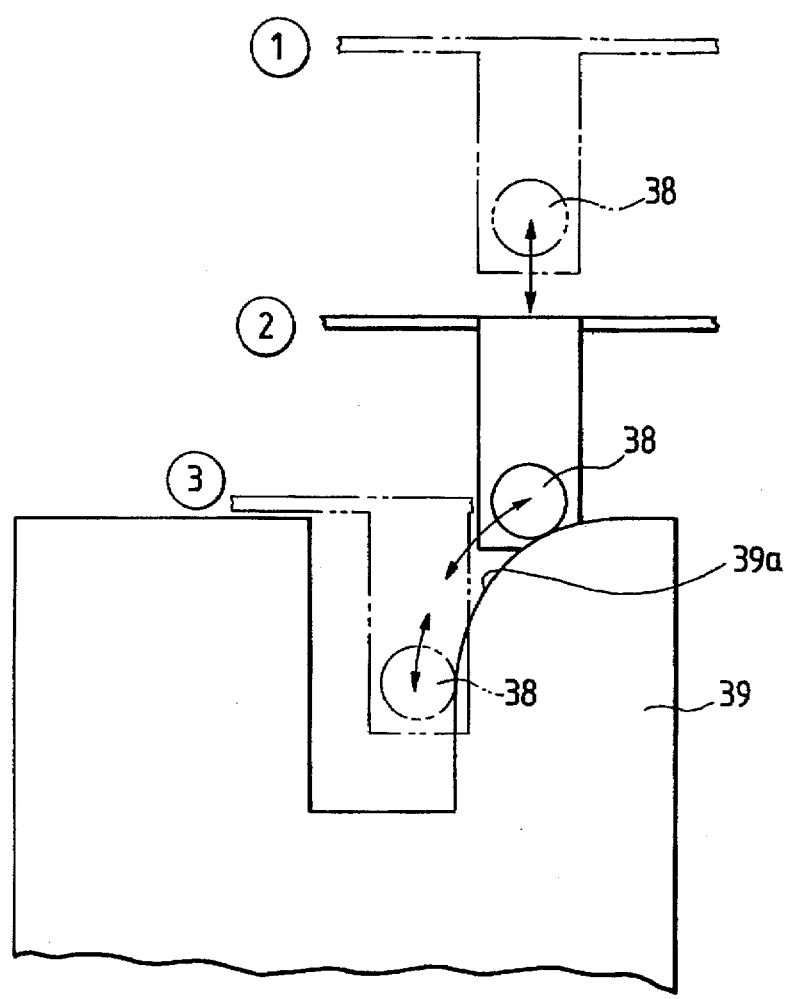
FIG. 13 illustrates the relationship between the cam lever and the cam surface which is the characteristics of the present invention.
Figure 14A:
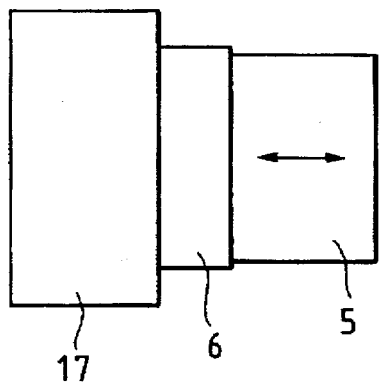
FIGS. 14A, 14B and 14C are schematic views which illustrate the protraction/retraction operation of the lens housing of the collapsible camera.
Figure 14B:
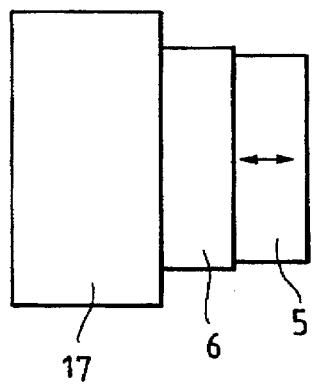
Figure 14C:
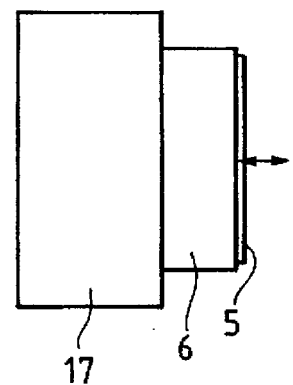

As shown in FIGS. 14A, 14B and 14C, the lens housing 5 thus constituted is protracted/retracted in a range from a normal imaging state to the collapsible state after a successive retraction with respect to the intermediate helicoid 6 adjacent to the black box 17. The above-described drawings correspond to the positional relationships between the cam lever 38 and the cam surface 39a designated by numerals ①, ② and ③ shown in FIG. 13. FIG. 14B illustrates the position at which the cam lever 38 engages to the front end portion of the cam surface 39a.

Figure 11:
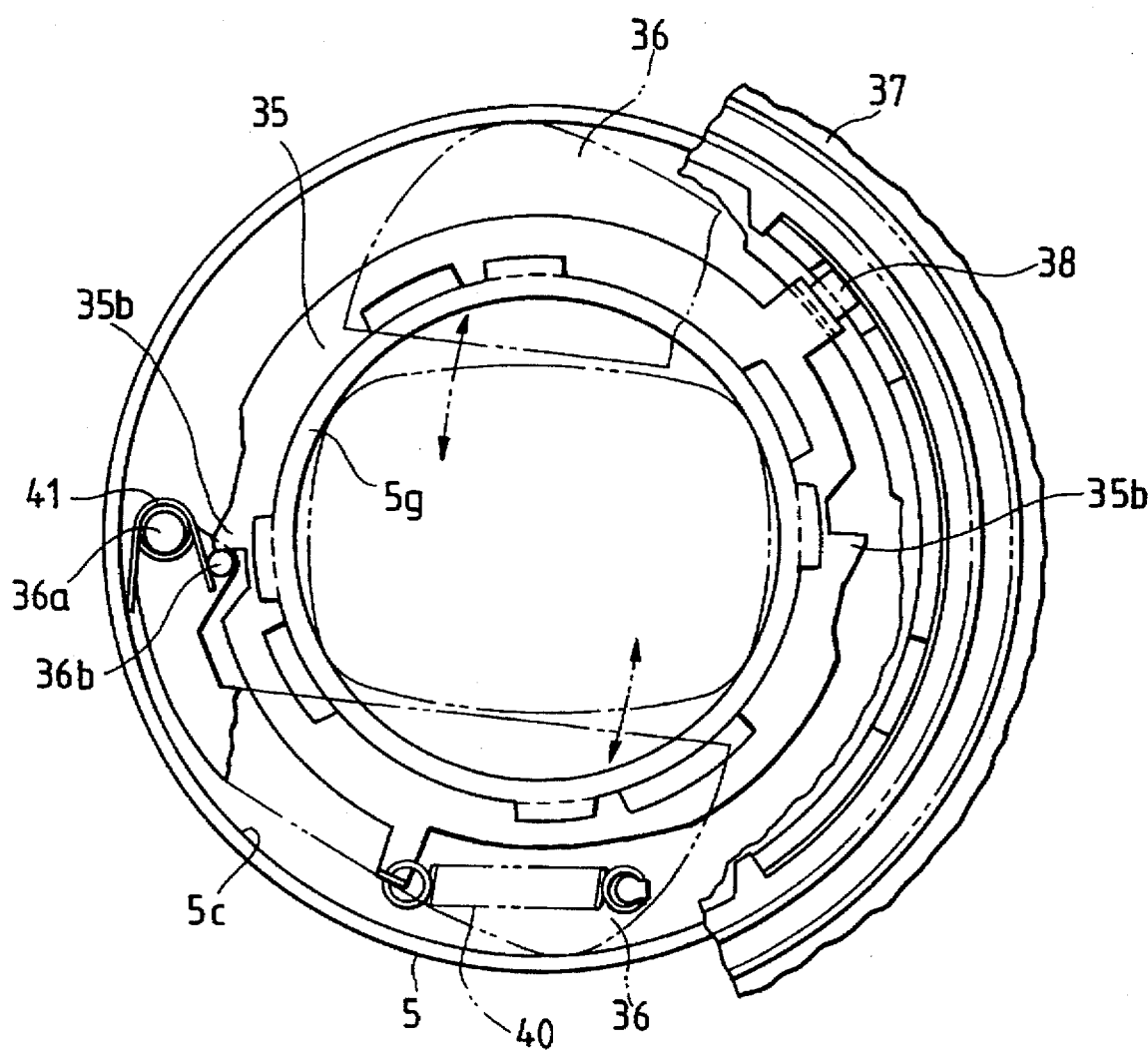
FIGS. 11 and 12 are schematic structural views which respectively illustrate the opening/closing action of the barrier when viewed from the front portion of the lens housing.

The operation of the thus constituted lens housing 5 will be briefly described. When the lens housing 5 is positioned as shown in FIG. 14A, the cam lever 38 is positioned away from the cam surface 39a. At this time, the barriers 36 and the associated elements are positioned as shown in FIG. 11. That is, the coil springs 41 which urge the barriers 36 push the fastening pins 36b in the opening direction and push the fastening claws 35b of the barrier operating ring 35. As a result, a force to rotate the barrier operating ring 35 acts. However, the urging force from the spring 40 is larger, so the barriers 36 maintain its opened state.

From this state, a lens housing driving system (the electric motor 42) is operated by control means (omitted from illustration), causing the lens housing 5 to commence to collapse. As a result, the cam lever 38 gradually comes closer to the cam surface 39a of the barrier opening/closing cam 39 until they come in contact with each other and engage to each other. FIGS. 14B and 13 ② respectively show the positional relationship in this state. The further collapse of the lens housing 5 causes the cam lever 38 to move along the cam surface 39a. As a result, the cam lever 38 is, against the urging force of the spring 40, rotated upon receipt of the force applied in the rotational direction. When the degree of the rotation increases, the urging force of the spring 40 is enlarged. As a result, the rotation is then stopped by control means (omitted from illustration) in the final collapse state shown in FIGS. 14C and 13 ③.

Figure 12:
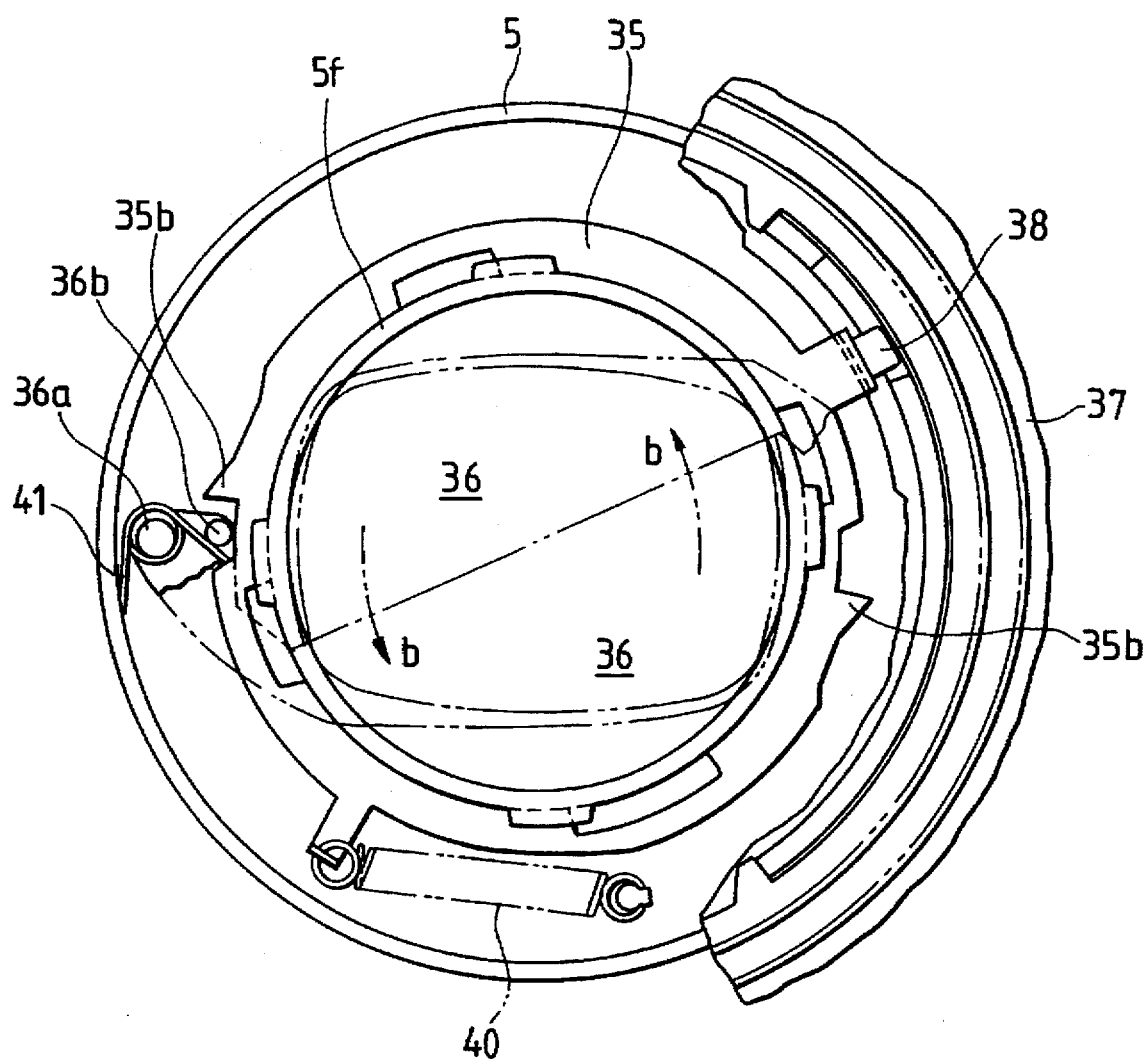

The operation of the barriers 36 due to the action of the cam lever 38 will be described with reference to FIGS. 11 and 12. When the barrier operating ring 35 is rotated due to the engagement of the cam lever 38 to the cam surface 39a, the fastening claws 35b move in the clockwise direction, that is, in the direction in which they separate from the fastening pins 36b. In this state, the urging force from the coil springs 41 acts on the fastening pins 36b. Therefore, the fastening pins 36b move while following the fastening claws 35b. As a result, the barriers 36 are rotated in the closing direction. When the barriers 36 are coupled to each other and the closed state as shown in FIG. 12 is realized, the above-described movement is stopped. On the other hand, the barrier operating ring 35 further rotates by a predetermined angular degree before it stops at the position at which the lens housing 5 is collapsed.

When the lens housing 5 is protracted from the collapsed state, the cam lever 38 moves along the cam surface 39a by the urging force of the spring 40. As a result, the barrier operating ring 35 is rotated counterclockwise when viewed in the drawing, causing the fastening claws 35b to be engaged to the fastening pins 36b. The urging force of the coil springs 41 are overcome, causing the barriers 36 to be rotated in the opening direction. Then, the rotation is stopped by the front end cylinder portion 5c of the lens housing 5. This state is designated by the positional relationship shown in FIGS. 11 and 13 ②. The lens housing 5 is further protracted until its reaches the position shown in FIG. 14A.

Figure 15A:
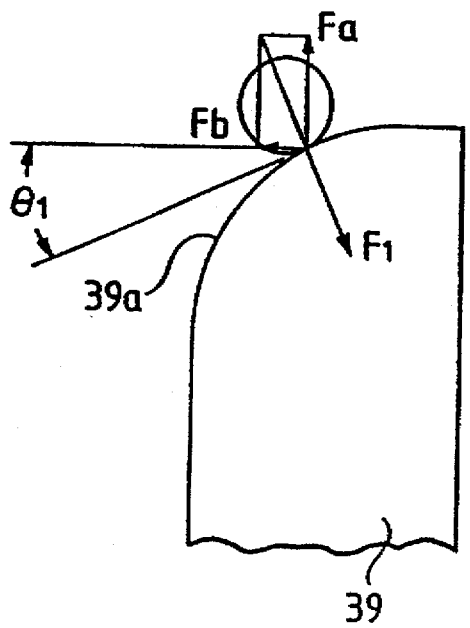
FIGS. 15A and 15B illustrate the relationship of the force when the fastening position is changed.
Figure 15B:
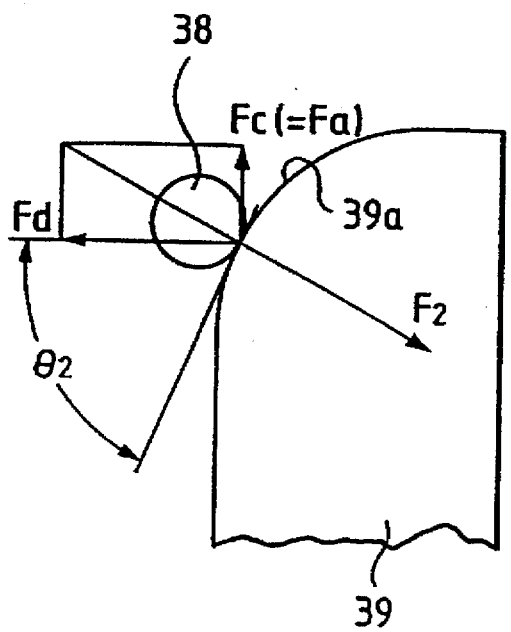

The present invention is characterized by the thus constituted barrier opening/closing mechanism arranged in such a manner that the cam surface 39a of the barrier opening/closing cam 39b adjacent to the lens housing 5 which engages to the cam lever 38 for opening/closing the lens protection barriers 36 on the front surface of the imaging lens in accordance with the movement of the cam lever 38 in the optical axis of the lens is, as shown in FIGS. 13, 15A and 15B, arranged in such a manner that the inclination angle θ2 is enlarged in the range in which the urging force of the spring 40 which urges the cam lever 38 in the direction in which the barriers 36 are opened is large. Furthermore, the inclination angle θ1 (<θ2) is reduced in the range in which the above-described urging force is small. The above-described angle enlargement/reduction is realized by the urging force of the spring 40. According to this embodiment, a structure is shown in which the cam surface 39a is composed of curved surface formed by continuously combining curves having different curvatures.

According to the above-described structure, in the range in which the urging force of the spring 40 acting on the cam lever 38 is large, the inclination angle θ2 becomes enlarged in the portion in which the barrier opening/closing cam 39 engages to the cam surface 39a. Therefore, the load at the time of rectilinearly moving the lens housing 5 can be reduced. Furthermore, in the range in which the urging force of the spring 40 is small, the inclination angle θ1 is small in the above-described engagement portion. Therefore, the load acting on the lens housing 5 can be made substantially the same as that in the above-described case. As a result, a substantially constant load is able to act on the driving system for rectilinearly moving the lens housing 5 regardless of the magnitude of the urging force of the spring 40 which acts on the cam lever 38.

The above-described effect will be described in detail with reference to FIGS. 15A and 15B. As shown in FIG. 15A, force F1 acts on the contact point at which the cam lever 38 engages to the front end of the cam surface 39a, the force F1 acting due to the driving force of the lens housing 5, the urging force from the spring 40 and the frictional force. The force F1 actually acts as load Fa for the lens housing 5 and force Fb which moves the cam lever 38. However, since the magnitude of the urging force of the spring 40 is not considerably large in this state, the cam lever can be easily moved even if the inclination (θ1) of the cam surface 39a and the force Fb are reduced. When collapse commences from the above-described state and the state shown in FIG. 15B is realized, the urging force of the spring 40 becomes enlarged, and force F2 (>F1) acting on the contact point becomes considerably large. However, load Fc (component force in the direction of collapse) of the lens housing 5 can be reduced in this state since the inclination (θ2) of the cam surface 39a has been enlarged. As a result, the load Fc can be made substantially the same as the load Fa shown in FIG. 15A. In this state, force Fd for operating the cam lever 38 has been enlarged so as to overcome the urging force of the spring 40.

Figure 17A:
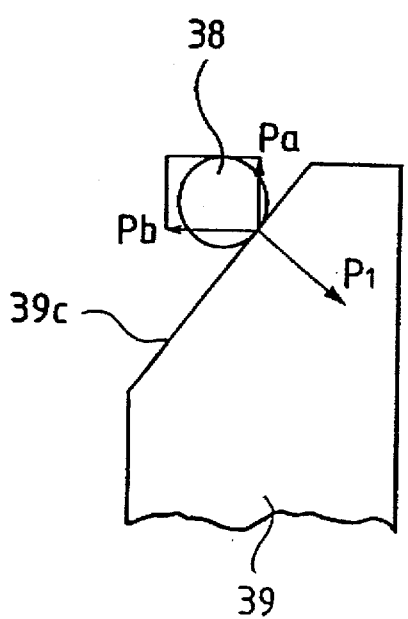
FIGS. 16, 17A and 17B are schematic view which illustrate a problem experienced with the conventional structure having a cam surface having a simple slanted surface.
Figure 17B:
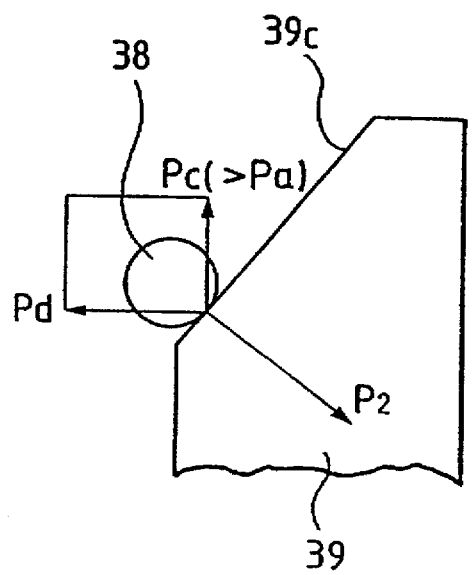
Figure 16:
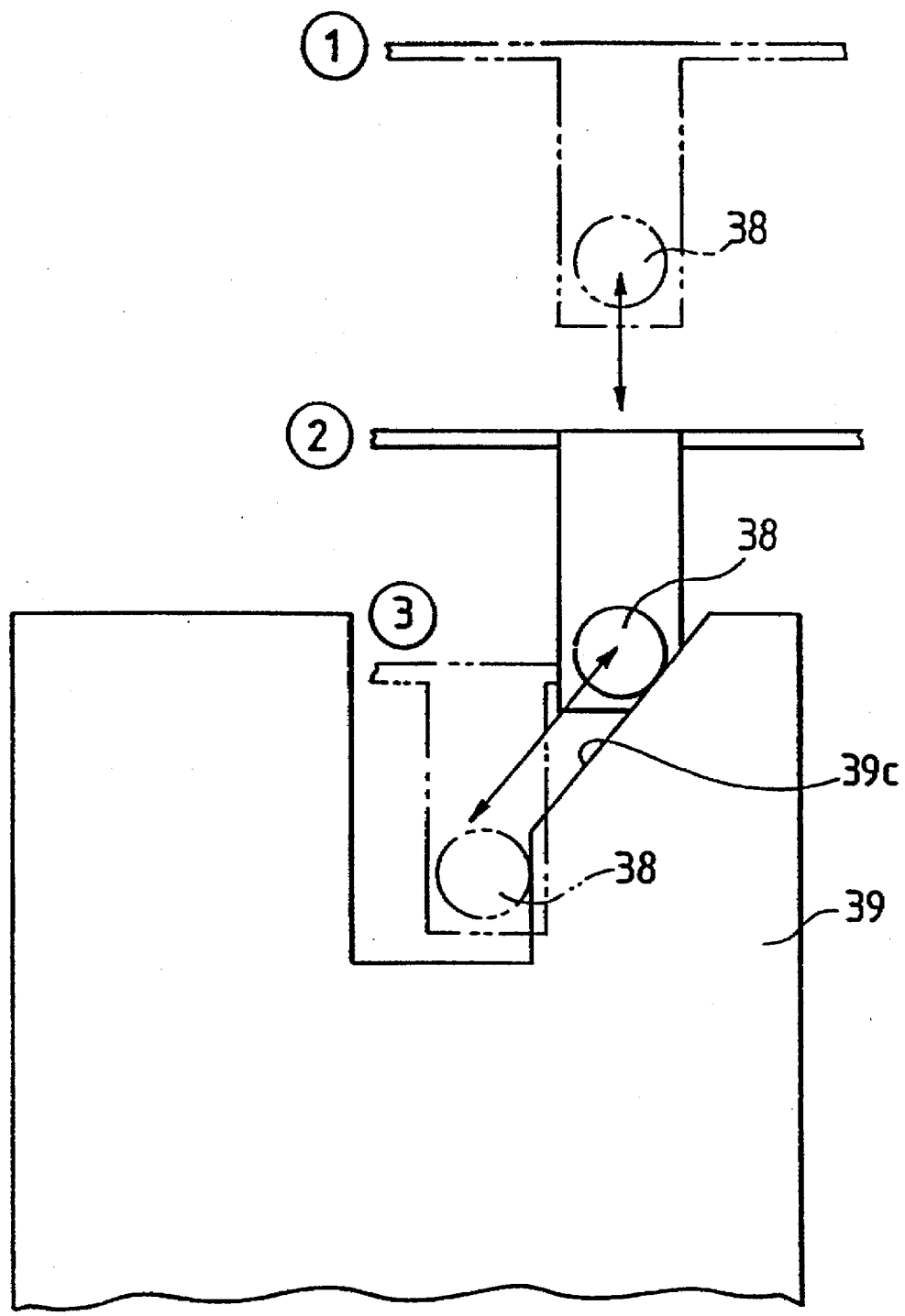

The conventional structure in which the cam surface of the barrier opening/closing cam 39 is a simple slanted surface (reference numeral 39c) will be briefly described with reference to FIGS. 16, 17A and 17B. During the opening/closing operation of the barriers 36, force P1 acts, due to the driving force of the lens housing, the urging force from the spring 40 and the frictional force, on the contact point at which the cam lever 38 engages to the front end portion of the cam surface 39c. The force P1 actually acts as load Pa of the lens housing 5 and force Pb for operating the cam lever 38. In this state, the quantity of deflection of the spring 40 is not large and the urging force from the same is small. When a state shown in FIG. 17B is realized, the quantity of the deflection of the spring 40 becomes large, causing its urging force to be enlarged. Therefore, the force P2 (>P1) acts as force Pc (>Pa) of the load of the lens housing 5 and force Pd for operating the cam lever 40. Therefore, the undesirable change in the load that takes place in the opening/closing operation of the barriers 36 cannot be prevented. According to the thus constituted conventional structure, the lens housing 5 cannot be moved smoothly. Furthermore, in order to drive the lens housing 5, the driving system including the electric motor 42 must be constituted in such a manner as to provide a force of a level which can operate it on the basis of the maximum load state shown in FIG. 17B. Therefore, the motor 42 and the like must have a large capacity, causing a problem to arise in that a battery will be quickly consumed. Therefore, the effect of the invention can be easily understood.

That is, according to the present invention, the structure is constituted in such a manner that the shape of the cam surface 39a of the barrier opening/closing cam 39 is structured as described above. Therefore, the loads Fa and Fc generated due to the engagement of the cam lever 38 to the cam surface 39a can be made uniform and constant over the entire range of the engagement regardless of the magnitude of the urging force of the spring 40 acting on the cam lever 38. Therefore, the rectilinear movement of the lens housing 5 by the lens housing driving system can be made a smooth operation. Furthermore, the generation of vibrations and noise due to the load change that takes place in the above-described lens housing driving system and a mechanism for opening/closing the barriers 36 in synchronization with the lens housing driving system can be prevented. In addition, eccentric wear or the like can be prevented, causing the durability of the overall apparatus to be improved.

The present invention is not limited to the above-described embodiments. The shape and structure and the like of the elements of the camera including the lens housing 5 may be optionally varied/modified. For example, according to the above-described embodiments, the cam surface 39a is formed by a curved surface having an inclination obtained from the relationship with the urging force of the spring 40. However, the present invention is not limited to this. For example, a warped surface, a circular arc surface, a parabolic surface or a surface formed by connecting straight lines may, of course, be optionally employed.

As described above, in the barrier opening/closing mechanism according to this embodiment, the cam surface of the barrier opening/closing cam adjacent to the camera housing is arranged as follows; The barrier opening/closing cam being arranged to engage to the cam lever, which opens/ closes the lens protection barrier disposed on the front surface of the imaging lens, so as to open/close the barrier in accordance with the movement of the cam lever in the direction of the optical axis of the lens. The cam surface is arranged in accordance with the urging force of the spring in such a manner that the inclination angle is enlarged in a range in which the urging force of the spring for urging the cam lever in the direction in which the barrier is opened is large. Furthermore, the inclination angle is reduced in a range in which the urging force is small. Therefore, the load of the cam lever due to the engagement of the barrier opening/closing cam to the cam surface can be substantially uniform over the entire range of the above-described engagement regardless of the magnitude of the urging force of the spring acting on the cam lever. Therefore, the lens housing can be smoothly rectilinearly moved by the lens housing driving system. Furthermore, the generation of vibrations and noise due to the load change that takes place in the above-described lens housing driving system and a mechanism for opening/closing the barriers 36 in synchronization with the lens housing driving system can be prevented. In addition, eccentric wear or the like can be prevented, causing the durability of the overall apparatus to be improved.

Although the invention has been described in its preferred forms with a certain degree of particularly, it is understood that the present disclosure of the preferred forms may be changed in the details of construction and the combination and arrangement of parts without departing from the spirit and the scope of the invention as hereinafter claimed.

What is claimed is:

1. A camera comprising:

a camera housing;

a lens housing disposed in said camera housing for movement along an optical axis through an opening in the camera housing; and a light shielding member in said camera housing, surrounding and in contact with said lens housing adjacent to said opening, said light shielding member having a substantially cylindrical circumferential flange surrounding said lens housing, said flange extending away from said opening and toward a free end of said flange in a direction having a component along the optical axis and disposed to prevent light entering said opening from reaching the interior of said camera housing past said flange.

2. A camera according to claim 1, wherein said light shielding member has an annular disc portion with an inner peripheral grooved surface in slidable engagement with an outer peripheral surface of said lens housing.

3. A camera according to claim 1, wherein said light shielding member comprises an elastic annular disc integrally formed with a rigid support.

4. A camera housing according to claim 1, wherein said light shielding member frictionally engages said lens housing and moves axially with said lens housing between a wall of said camera housing in which said opening is formed, at one side of said light shielding member, and a component of said camera spaced from said wall, at the opposite side of said light shielding member.

* * * * *